(12) United States Patent
Mosher et al.

(10) Patent No.: US 10,388,179 B2
(45) Date of Patent: Aug. 20, 2019

(54) ANALYTICS PLATFORM

(71) Applicant: Accenture Global Solutions Limited, Dublin (IE)

(72) Inventors: Patrick Mosher, Minnetonka, MN (US); Keith Thomas McInerney, Seattle, WA (US); Richard J. Bakosh, Sarasota, FL (US); Tanushree Guha, Kolkata (IN); Samuel R. Tepper, Glen Ellyn, IL (US)

(73) Assignee: Accenture Global Solutions Limited, Dublin (IE)

( * ) Notice: Subject to any disclaimer, the term of this patent is extended or adjusted under 35 U.S.C. 154(b) by 168 days.

(21) Appl. No.: 15/365,395

(22) Filed: Nov. 30, 2016

(65) Prior Publication Data
US 2017/0287348 A1    Oct. 5, 2017

Related U.S. Application Data

(63) Continuation-in-part of application No. 12/141,247, filed on Jun. 18, 2008.

(51) Int. Cl.
*G09B 7/10*   (2006.01)
*G06N 5/02*   (2006.01)
(Continued)

(52) U.S. Cl.
CPC ............ *G09B 7/10* (2013.01); *G06N 5/022* (2013.01); *G06Q 10/06393* (2013.01); *G06Q 10/10* (2013.01)

(58) Field of Classification Search
CPC .......... G09B 7/10; G06N 5/022; G06Q 10/10; G06Q 10/06393
See application file for complete search history.

(56) References Cited

U.S. PATENT DOCUMENTS 5,551,880 A  *  9/1996  Bonnstetter ............ G06Q 99/00
                                                434/236
5,684,964 A     11/1997  Powers et al.
(Continued)

OTHER PUBLICATIONS

Examiner's First Report issued in Australian Application No. 2009202428 on Feb. 21, 2011.

*Primary Examiner* — Corbett B Coburn
(74) *Attorney, Agent, or Firm* — Harrity & Harrity, LLP

(57) ABSTRACT

An analytics platform may generate one or more user interfaces based on the set of testing parameters. The analytics platform may provide the one or more user interfaces. The analytics platform may receive first test information corresponding to first respondents. The analytics platform may identify, based on the first test information and based on information identifying particular respondents of the first respondents, characteristic attributes of the particular respondents. The analytics platform may train, based on the values of the characteristic attributes and performance information associated with the first respondents, a predictive model. The analytics platform may obtain the second test information corresponding to the one or more second respondents. The analytics platform may determine the predicted performance information associated with the one or more second respondents using the predictive model. The analytics platform may perform an action based on the predicted performance information.

20 Claims, 16 Drawing Sheets

(51) Int. Cl.
  *G06Q 10/06* (2012.01)
  *G06Q 10/10* (2012.01)

(56) References Cited

U.S. PATENT DOCUMENTS

| | | |
|---|---|---|
| 6,119,097 A | 9/2000 | Ibarra |
| 6,334,121 B1 * | 12/2001 | Primeaux .............. G06F 21/552 |
| | | 706/52 |
| 7,080,057 B2 | 7/2006 | Scarborough et al. |
| 7,103,524 B1 * | 9/2006 | Teig .................... G06F 17/5081 |
| | | 703/14 |
| 7,181,413 B2 | 2/2007 | Hadden et al. |
| 7,225,141 B2 | 5/2007 | Calderaro et al. |
| 7,472,097 B1 | 12/2008 | Scarborough et al. |
| 7,483,842 B1 | 1/2009 | Fung et al. |
| 7,606,778 B2 | 10/2009 | Dewar |
| 7,752,082 B2 | 7/2010 | Calabria |
| 7,945,472 B2 | 5/2011 | Pappas et al. |
| 8,311,874 B2 | 11/2012 | Gupta et al. |
| 8,554,601 B1 | 10/2013 | Marsh et al. |
| 9,495,642 B1 * | 11/2016 | Smith .................. G06F 11/3684 |
| 9,524,476 B2 * | 12/2016 | Steinberg ............. G06K 9/6282 |
| 2002/0055866 A1 | 5/2002 | Dewar |
| 2002/0107931 A1 | 8/2002 | Singh et al. |
| 2003/0208388 A1 | 11/2003 | Farkas et al. |
| 2004/0091841 A1 | 5/2004 | Buchtel et al. |
| 2004/0205176 A1 | 10/2004 | Ting et al. |
| 2006/0036560 A1 | 2/2006 | Fogel |
| 2006/0282306 A1 | 12/2006 | Thissen-Roe |
| 2008/0086359 A1 | 4/2008 | Holton et al. |
| 2009/0048884 A1 | 2/2009 | Olives et al. |
| 2009/0319344 A1 | 12/2009 | Tepper et al. |
| 2010/0094785 A1 * | 4/2010 | Kuroiwa ............... G06Q 10/04 |
| | | 706/12 |
| 2015/0039540 A1 * | 2/2015 | Dong .................... G06F 17/18 |
| | | 706/12 |
| 2015/0112899 A1 * | 4/2015 | Dagum ................ A61B 5/6898 |
| | | 706/12 |
| 2016/0021174 A1 * | 1/2016 | De Los Santos Vilchez ............. |
| | | H04L 43/10 |
| | | 709/201 |

\* cited by examiner

Sales Personality Profile for Joe Smith

All items are mandatory so please score each one.
Any unanswered item(s) will reappear at the top of the next page.

Percent Complete [ ] 0%

| | Strongly disagree | Moderately disagree | Moderately agree | Strongly agree |
|---|---|---|---|---|
| 1. Compared to my friends, I am much more willing to take chances | ○ | ○ | ○ | ○ |
| 2. It comes naturally for me to take charge of groups in which I am a member | ○ | ○ | ○ | ○ |
| 3. Society would be better off if all our citizens followed the rules | ○ | ○ | ○ | ○ |
| 4. Sometimes I use flattery or praise to motivate a coworker to do something I want him/her to do | ○ | ○ | ○ | ○ |
| 5. I find it easy to control most conversations | ○ | ○ | ○ | ○ |
| 6. My current job doesn't seem to offer much future growth potential | ○ | ○ | ○ | ○ |

[continue]  Continue with the next portion of the survey.
[stop]  Save submissions and continue later.

FIG. 6

Sales Competency Rating for Joe Smith

The following questionnaire provides you with the opportunity to give valuable and meaningful feedback to Joe Smith on a number of his/her sales and leadership skills and personal attributes. Be assured that your ratings are confidential. The code you entered is not linked to your name in any way. It is only used to keep track of submissions.

Relationship:
- ○ Supervisor
- ○ Peer
- ○ Direct-report
- ○ Customer
- ○ Self
- ○ Other Degree of Familiarity:
- ○ Extremely Familiar
- ○ Very Familiar
- ○ Moderately Familiar
- ○ Somewhat Familiar
- ○ Not at all Familiar

| | |
|---|---|
| 12. How often do you analyze and plan your territory? | When I close a sale |
| 13. How much time does it typically take you to analyze and plan your territory per month? | 10 to < 15 hours |
| 14. How often do you refresh your sales plans and/or update prospect data / comments / info? | When I identify a new prospect or lead |
| 15. How many days do you spend each year attending company or division-wide meetings and/or trade shows? | 2 to < 4 days |
| 16. How many days per year do you spend in company-mandated training, e.g. sensitivity, diversity, etc.? | 0 to < 1 day |
| 17. How many days a year do you spend in company-sponsored sales training? | 4 to < 5 days |
| 18. How many days per year do you spend in company-sponsored product and/or service-related training? | 0 to < 1 day |
| 19. How many days per year do you spend in systems / technical training, e.g. CRM, SFA, Excel, SAP, etc.? | N/A - My company does not sponsor systems / technical training |
| 20. How many days a year do you spend in non-company sponsored business-related training? | N/A - I do not participate in non company-sponsored training |
| 21. Which of the following sales-related training have you taken? (check all that apply) | Miller Heiman |

1002         1004

[continue]   [stop]

FIG. 10

ANALYTICS PLATFORM

RELATED APPLICATION

This application is a continuation-in-part of U.S. patent application Ser. No. 12/141,247, entitled "ASSESSMENT OF SALES FORCE PERSONNEL FOR IMPROVEMENT OF SALES PERFORMANCE" and filed on Jun. 18, 2008, which is hereby incorporated by reference in its entirety.

BACKGROUND

Data analytics involves inspecting, cleaning, transforming, and modeling data with the goal of discovering useful information, suggesting conclusions, and performing actions based on the useful information and conclusions. One type of data analytics is predictive analytics, which focuses on application of statistical models for predictive forecasting or classification. Another type of data analytics is text analytics, which applies statistical, linguistic, and structural techniques to extract and classify information from textual sources or samples.

SUMMARY

According to some possible implementations, an analytics platform may include one or more processors to receive a set of testing parameters. The one or more processors may generate one or more user interfaces based on the set of testing parameters. The one or more user interfaces may include elements based on which to determine values associated with attributes of respondents. The one or more processors may provide, for display by a set of user devices, the one or more user interfaces. The one or more processors may receive, from the set of user devices and based on interactions with the one or more user interfaces, first test information corresponding to first respondents. The first test information may identify first values of the attributes associated with the first respondents. The one or more processors may identify, based on the first test information and based on information identifying particular respondents of the first respondents, characteristic attributes of the particular respondents. The analytics platform may identify the characteristic attributes based on the characteristic attributes being associated with the particular respondents. The one or more processors may train, based on the values of the characteristic attributes and performance information associated with the first respondents, a predictive model. The predictive model may receive, as input, second test information associated with one or more second respondents. The predictive model may output predicted performance information associated with the one or more second respondents. The one or more processors may obtain the second test information corresponding to the one or more second respondents. The one or more processors may determine the predicted performance information associated with the one or more second respondents using the predictive model. The one or more processors may perform an action based on the predicted performance information.

According to some possible implementations, a method may include receiving, by a device, a set of testing parameters. The method may include generating, by the device, one or more user interfaces based on the set of testing parameters. The user interfaces may include elements based on which to determine values associated with attributes of respondents. The method may include providing, by the device and for display by a set of user devices, the one or more user interfaces. The method may include receiving, from the set of user devices and based on interactions with the one or more user interfaces, first test information corresponding to first respondents. The first test information may identify first values of the attributes associated with the first respondents. The method may include identifying, by the device, based on the first test information and based on information identifying particular respondents of the first respondents, characteristic attributes of the first respondents. The characteristic attributes may be identified based on respective values of the characteristic attributes being associated with the particular respondents. The method may include training, based on the values of the characteristic attributes and performance information associated with the first respondents, a predictive model. The predictive model may receive, as input, second test information associated with one or more second respondents. The predictive model may output predicted performance information associated with the one or more second respondents. The method may include obtaining, by the device, the second test information corresponding to the one or more second respondents. The method may include determining, by the device, the predicted performance information associated with the one or more second respondents using the predictive model. The method may include performing, by the device, an action based on the predicted performance information.

According to some possible implementations, a non-transitory computer-readable medium may store one or more instructions that, when executed by one or more processors, may cause the one or more processors to receive a set of testing parameters. The one or more instructions, when executed by one or more processors, may cause the one or more processors to generate one or more user interfaces based on the set of testing parameters. The user may interface to receive information identifying values associated with attributes of a set of respondents. The one or more instructions, when executed by one or more processors, may cause the one or more processors to provide, for display by a set of user devices, the one or more user interfaces. The one or more instructions, when executed by one or more processors, may cause the one or more processors to receive, from the set of user devices and based on interactions with the one or more user interfaces, first test information corresponding to first respondents of the set of respondents. The first test information may identify first values of the attributes associated with the first respondents. The one or more instructions, when executed by one or more processors, may cause the one or more processors to identify, based on the first test information and based on information identifying particular respondents of the first respondents, characteristic attributes of the particular respondents. The characteristic attributes may be identified based on values of the characteristic attributes that are correlated with the particular respondents. The one or more instructions, when executed by one or more processors, may cause the one or more processors to train, based on the values of the characteristic attributes and performance information associated with the first respondents, a predictive model. The predictive model may receive, as input, second test information associated with one or more second respondents of the set of respondents. The predictive model may output predicted performance information associated with the one or more second respondents. The one or more instructions, when executed by one or more processors, may cause the one or more processors to obtain the second test information corresponding to the one or more second respondents. The one or more instructions, when executed by one or more processors, may cause the one or more processors to determine the predicted performance information associated with the one or more second respondents using the predictive model. The one or more instructions, when executed by one or more processors, may cause the one or more processors to perform an action based on the predicted performance information.

BRIEF DESCRIPTION OF THE DRAWINGS

FIGS. 6-14 are example implementations of user interfaces for identifying respondent attributes based on test information.

DETAILED DESCRIPTION

Figure 1A:
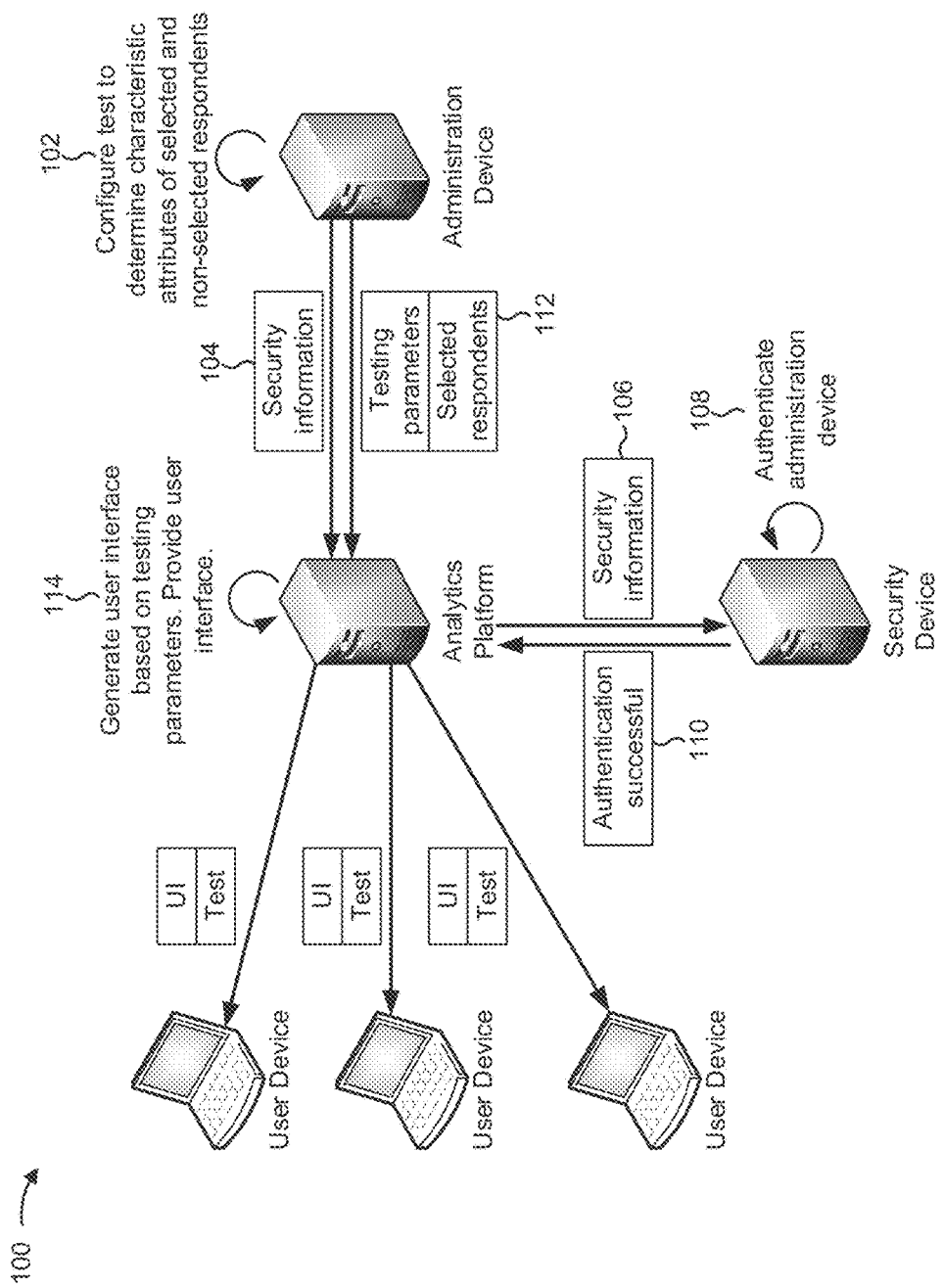
FIGS. 1A-1C are diagrams of an overview of an example implementation described herein.

The following detailed description of example implementations refers to the accompanying drawings. The same reference numbers in different drawings may identify the same or similar elements.

Different entities (e.g., employees of a company, students of a class, etc.) may be associated with different attributes, and may perform differently with regard to a task. For example, a first entity may perform the task more efficiently or more effectively than a second entity. In some cases, the attributes associated with the entities may be correlated with performance of the entities. For example, a particular attribute may be associated with improved performance of entities with regard to the task.

The attributes may include, for example, behavior attributes identifying how an entity spends his or her time engaged in particular activities, competency attributes relating to proficiency or competency of an entity with regard to the task, or personality attributes relating to personality states or traits of an entity. As used herein, "entity" may refer to a person to be evaluated to determine values of the attributes, and/or may refer to a person, other than the person to be evaluated, who provides information based on which to determine the values of the attributes.

Implementations described herein use computational approaches such as machine learning, artificial intelligence techniques, regression analysis, and statistical analysis to identify correlations between attributes and performance of entities with regard to a task. Implementations described herein automatically obtain test information for respondents (e.g., persons or entities who are to be evaluated based on the test information, or people associated with the entities, such as managers, coworkers, or the like) based on automatically generating a user interface to obtain the test information. Based on performance information associated with the respondents, implementations described herein divide the respondents into two or more categories and identify characteristic attributes corresponding to the categorized respondents. Also, implementations described herein may predict performance of subsequent respondents (e.g., individual respondents) based on test information received from the subsequent respondents.

Furthermore, implementations described herein may generate reports describing the respondents, the attributes of the respondents, and/or the categories assigned to the respondents. For example, these reports may be segmented based on high performers versus core performers. Additionally, or alternatively, the reports may be tailored for use by a respondent (e.g., to improve performance), a manager (e.g., to assess a respondent), an executive (e.g., to assess performance in different geographic segments, product segments, market segments, etc.), or another entity.

In some implementations, implementations described herein may be used as a screening process for potential hiring decisions. For example, potential hires may provide responses as second respondents, and may be evaluated or categorized based on the responses in view of characteristic attributes of the first respondents. This may permit rules-based objective evaluation of what was previously subject human evaluation (e.g., suitability of potential hires for available positions).

In this way, implementations described herein perform a well-defined rules-based process to automate a task that was previously performed by a human based on subjective intuition of the human (e.g., identifying attributes of users, identifying correlations between attributes and performance, and selecting entities for tasks based on the attributes based on intuition and experience of a manager). Moreover, processor resources are conserved that would otherwise be used to configure an approach for determining correlations between attributes and performance (e.g., based on a manually-generated user interface, based on manually specified rules, etc.). Furthermore, allocation or training of entities may be improved based on the correlations, which saves organizational resources and improves performance of the entities.

Figure 1B:
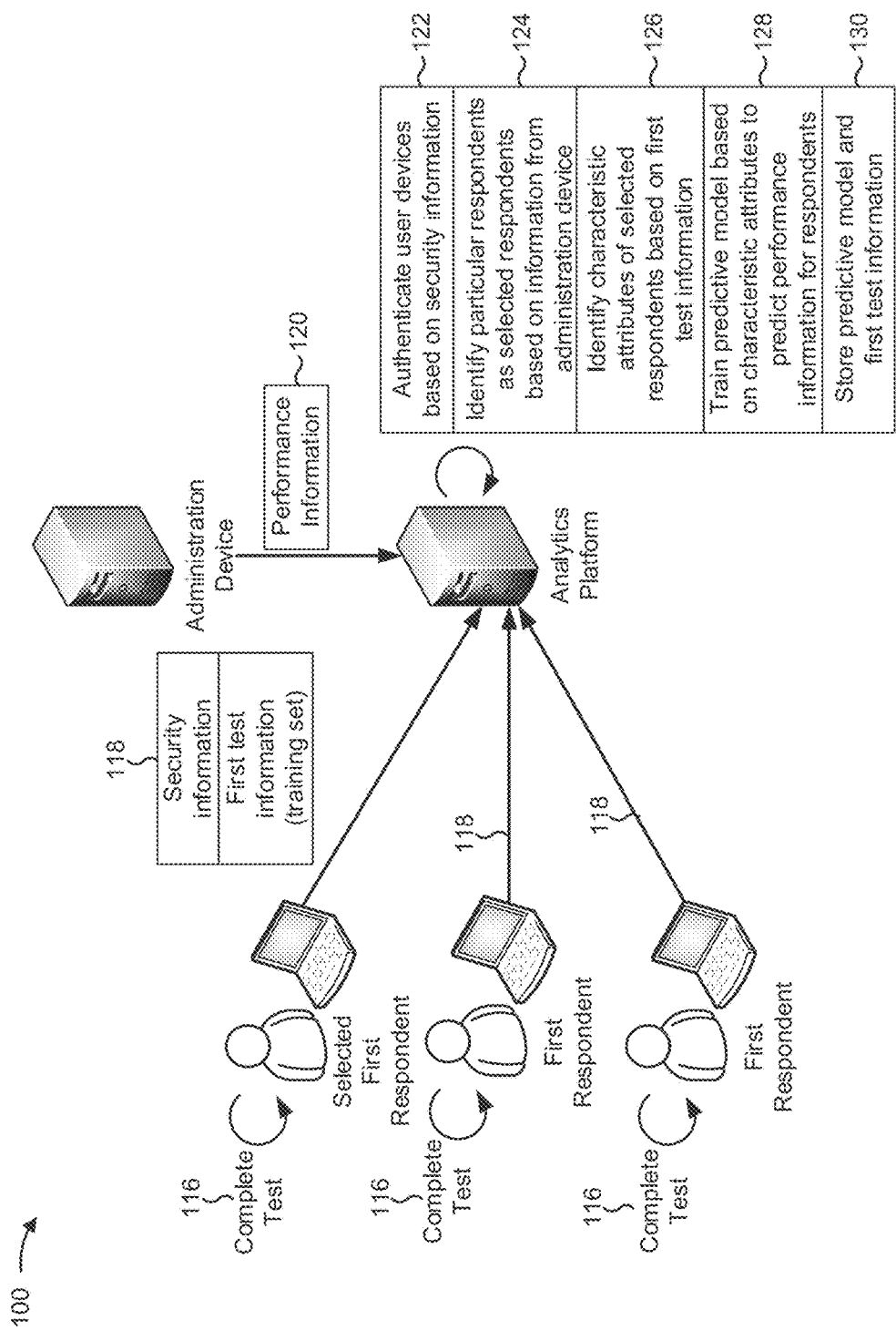
Figure 1C:
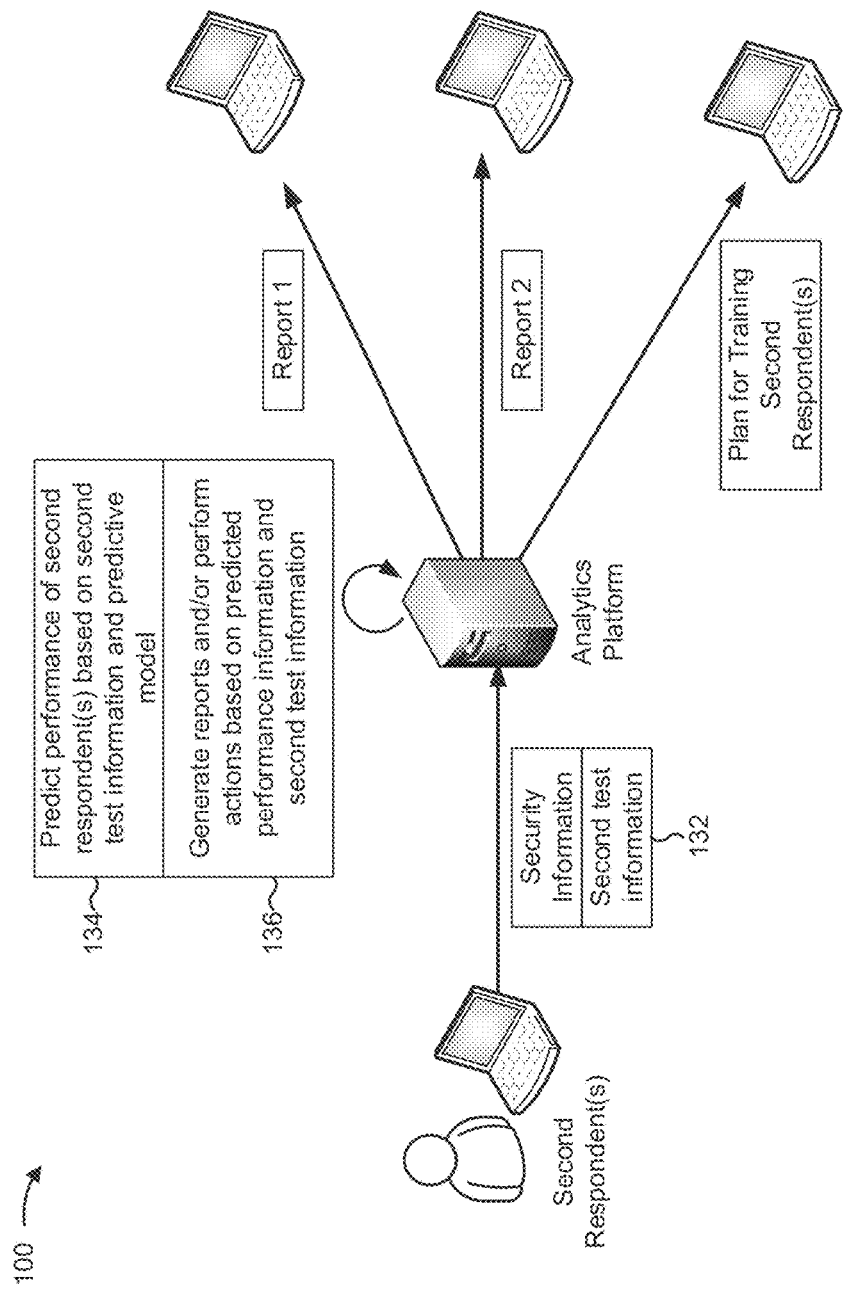

FIGS. 1A-1C are diagrams of an overview of an example implementation 100 described herein. Example implementation 100 is an example of determining test information for a set of first respondents (including selected respondents and non-selected respondents), determining characteristic attributes of the selected respondents based on the test information and based on performance information for the respondents, and predicting performance of second respondents based on the characteristic attributes and based on test information associated with the second respondents.

As shown in FIG. 1A, and by reference number 102, an administration device may configure a test to determine characteristic attributes of selected respondents and non-selected respondents. As shown by reference number 104, to access an analytics platform to configure the test, the administration device may provide security information to the analytics platform. The security information may include, for example, a credential associated with the administration device, a password, a security key, a token, or the like.

As shown by reference number 106, the analytics platform may provide the security information to a security device. As shown by reference number 108, the security device may authenticate the administration device. For example, the security device may determine whether the security information provided by the administration device is valid and/or authentic based on information stored by or available to the security device (e.g., account information associated with the administration device, etc.). Assume that the security device determines that the security information is valid and/or authentic. As shown by reference number 110, the security device may provide information to the analytics platform indicating that authentication of the administration device is successful. Thus, the analytics platform authenticates the administration device, which improves security of the analytics platform.

As shown by reference number 112, the administration device may provide testing parameters and information identifying selected respondents (e.g., information identifying particular respondents) to the analytics platform. In some implementations, the administration device may provide the testing parameters and the information identifying the selected respondents via a secure connection, such as a secure session. The secure connection may be established based on authentication of the administration device. Thus, security of the testing parameters and the information identifying the selected respondents is improved.

In some implementations, the testing parameters may identify criteria for determining values of attributes of respondents (e.g., entities who complete the test). The respondents may include, for example, employees of a company, students of a class, or the like. The attributes may include personality attributes, behavior attributes, performance attributes, or the like, and a value of an attribute may indicate whether a respondent is associated with the attribute. A characteristic attribute may include an attribute that is correlated with status as a selected respondent or a non-selected respondent. A selected respondent may include a respondent for which the administration platform is to identify characteristic attributes. For example, a selected respondent may include a high-performing employee, a high-performing student, or the like.

As shown by reference number 114, the analytics platform may generate a user interface (UI) based on the testing parameters. The UI may provide a test, and the analytics platform may determine values of attributes based on responses of the respondents to the test. For a more detailed description of such a user interface, refer to the description of FIGS. 6-10, below.

As shown in FIG. 1B, and by reference number 116, first respondents may complete the test. As further shown, the first respondents may include one or more selected respondents and one or more non-selected respondents. While three respondents are shown, it will be appreciated that, in practice, the number of respondents may be in the hundreds, thousands, tens of thousands, hundreds of thousands, millions, or more. As shown by reference number 118, the user devices corresponding to the first respondents (e.g., the selected respondents and the non-selected respondents) may provide first test information identifying the responses provided by the first respondents. As shown, the first test information may be used as a training set to train a predictive model to predict performance of respondents based on test information associated with the respondents.

As further shown, the user devices may provide security information. For example, the UIs provided by the user devices may receive security information from the respondents (e.g., usernames, passwords, etc.), and the user devices may provide the security information to the analytics platform. As another example, the user devices may determine the security information, and may provide the security information (e.g., a token associated with the user devices, information identifying a secure session associated with the user devices, etc.). In this way, security of the first test information is improved.

As shown by reference number 120, a server device may provide performance information associated with the first respondents to the analytics platform. The performance information may identify performance of the first respondents with regard to a set of criteria. For example, when the respondents include salespersons, the performance information may identify sales performance of each respondent. As another example, when the respondents include students, the performance information may identify test scores of each respondent.

As shown by reference number 122, the analytics platform may authenticate the user devices based on the security information. For example, the analytics platform may provide the security information to a security device, and the security device may determine whether the security information is authentic and/or valid. Assume that the security device determines that the security information is authentic and/or valid. Based on the security information being authentic and/or valid, the analytics platform may establish a secure session with the user devices and/or may accept the first test information provided by the user devices.

As shown by reference number 124, the analytics platform may identify particular respondents as selected respondents based on the information provided by the administration device in connection with FIG. 1A (e.g., the top-most respondent shown in FIG. 1B). As shown by reference number 126, the analytics platform may identify characteristic attributes of the selected respondents based on the first test information. For example, the analytics platform may perform regression analysis, statistical analysis, machine learning processes, neural network processes, or the like, to identify the characteristic attributes based on the characteristic attributes being statistically correlated with status of the first respondents as selected respondents or non-selected respondents.

As shown by reference number 128, the analytics platform may train a predictive model, based on the values of the characteristic attributes, to identify values of the characteristic attributes that predict performance information for a respondent. In some implementations, the analytics platform may train the predictive model based on the values of the characteristic attributes and of non-characteristic attributes (e.g., the training set of first test information), which may improve accuracy of the model. In some implementations, the analytics platform may train the predictive model based on the values of the characteristic attributes and not the non-characteristic attributes, which may reduce processor consumption that would otherwise be used to process the non-characteristic attributes based on the predictive model. As shown by reference number 130, the analytics platform may store the predictive model and the first test information.

As shown in FIG. 1C, and by reference number 132, the analytics platform may receive second test information from a user device associated with one or more second respondents. For example, the analytics platform may provide, to the user device, a UI similar to the UI described in connection with FIG. 1B, and the UI may receive input identifying test responses for the one or more second respondents. The second respondents may include, for example, employees of a company, students of a class, or the like. As further shown, the user device associated with the one or more second respondents may provide security information. For example, the UI provided by the user device may receive security information from the second respondents (e.g., usernames, passwords, etc.), and the user device may provide the security information to the analytics platform. As another example, the user device may determine the security information, and may provide the security information (e.g., a token associated with the user device, information identifying a secure session associated with the user device, etc.). In this way, security of the second test information is improved.

As shown by reference number 134, the analytics platform may predict performance of the one or more second respondents based on the second test information and based on the predictive model. For example, the analytics platform may identify values of the characteristic attributes corresponding to the second respondents, and may input the values corresponding to the second respondents to the predictive model. The predictive model may output predicted performance information based on comparing the values corresponding to the second respondents and values of the characteristic attributes corresponding to the selected respondents. For example, the predictive model may determine the predicted performance information based on relationships between the values of the characteristic attributes corresponding to the selected respondents and the performance information corresponding to the selected respondents. In some implementations, the predictive model may output information identifying a prediction of whether a particular respondent is likely to be categorized as a selected respondent or a non-selected respondent.

As shown by reference number 136, the analytics platform may generate one or more reports based on the predicted performance information and the second test information. For example, as shown, the analytics device may provide reports (e.g., Report 1 and Report 2) to various user devices. A report may provide information regarding the predicted performance information, the second test information, and/or values of the characteristic attributes associated with the selected respondents and/or the second respondents. For example, a report may provide, to a second respondent or an entity associated with a second respondent (e.g., a manager, a coworker, a teacher, etc.), a comparison of values of characteristic attributes of the second respondents and values of characteristic attributes of selected respondents (e.g., average values, best values, a range of values, etc.), as described in more detail in connection with FIG. 12, below. Other examples of reports are possible, and are described in more detail in connection with FIGS. 5, 11, 13, and 14, below.

As further shown, the analytics platform may perform one or more actions based on the predicted performance information and the second test information. Here the analytics platform generates and provides a plan for training the second respondents based on the predicted performance information and the second test information. For example, the plan may identify areas in which the one or more second respondents are to improve performance, classes to be provided for the one or more second respondents, or the like. In this example, analytics platform may automatically enroll the one or more second respondents into the classes or automatically schedule a company to come and teach the classes. In this way, the analytics platform automatically performs an action based on a quantitative analysis of attributes of respondents, which permits rules-based determination of a previously subjective action performed by a human (e.g., comparison of attributes of respondents and determination of actions to be performed with regard to the respondents).

In some implementations, the analytics platform may perform another action. For example, the analytics platform may cause one or more second respondents to be terminated, reassigned, promoted, or the like. As another example, the analytics platform may automatically schedule performance reviews for the one or more selected respondents. As yet another example, the analytics platform may obtain additional information from the one or more second respondents (e.g., based on another test, based on scheduling a meeting with the one or more second respondents, etc.). As another example, the analytics platform may obtain information identifying actual performance of the one or more second respondents, and may update the predictive model based on the information identifying actual performance. Thus, accuracy of the predictive model is improved and processor and organizational resources that would be used to facilitate manual configuration of the predictive model are conserved.

In this way, processor resources are conserved that would otherwise be used to configure an approach for determining correlations between attributes and performance (e.g., based on a manually-generated user interface for testing, based on manually specified rules, etc.). Moreover, implementations described herein use well-defined automatic processes to automate a task that was previously performed by a human based on subjective intuition of the human (e.g., identifying attributes of users, identifying correlations between attributes and performance, and selecting users for tasks based on the attributes). These well-defined automatic processes, such as machine learning, artificial intelligence, neural networking, and the like, include steps that are not traditionally performed by a human when predicting performance of employees. Furthermore, allocation or training of respondents and resources associated with the respondents may be improved based on the correlations, which saves organizational resources and improves performance of the respondents. Additional details regarding implementations described herein can be found in U.S. patent application Ser. No. 12/141,247, filed Jun. 18, 2008, the entire contents of which is incorporated by reference herein.

As indicated above, FIGS. 1A-1C are provided merely as an example. Other examples are possible and may differ from what was described with regard to FIGS. 1A-1C.

Figure 2:
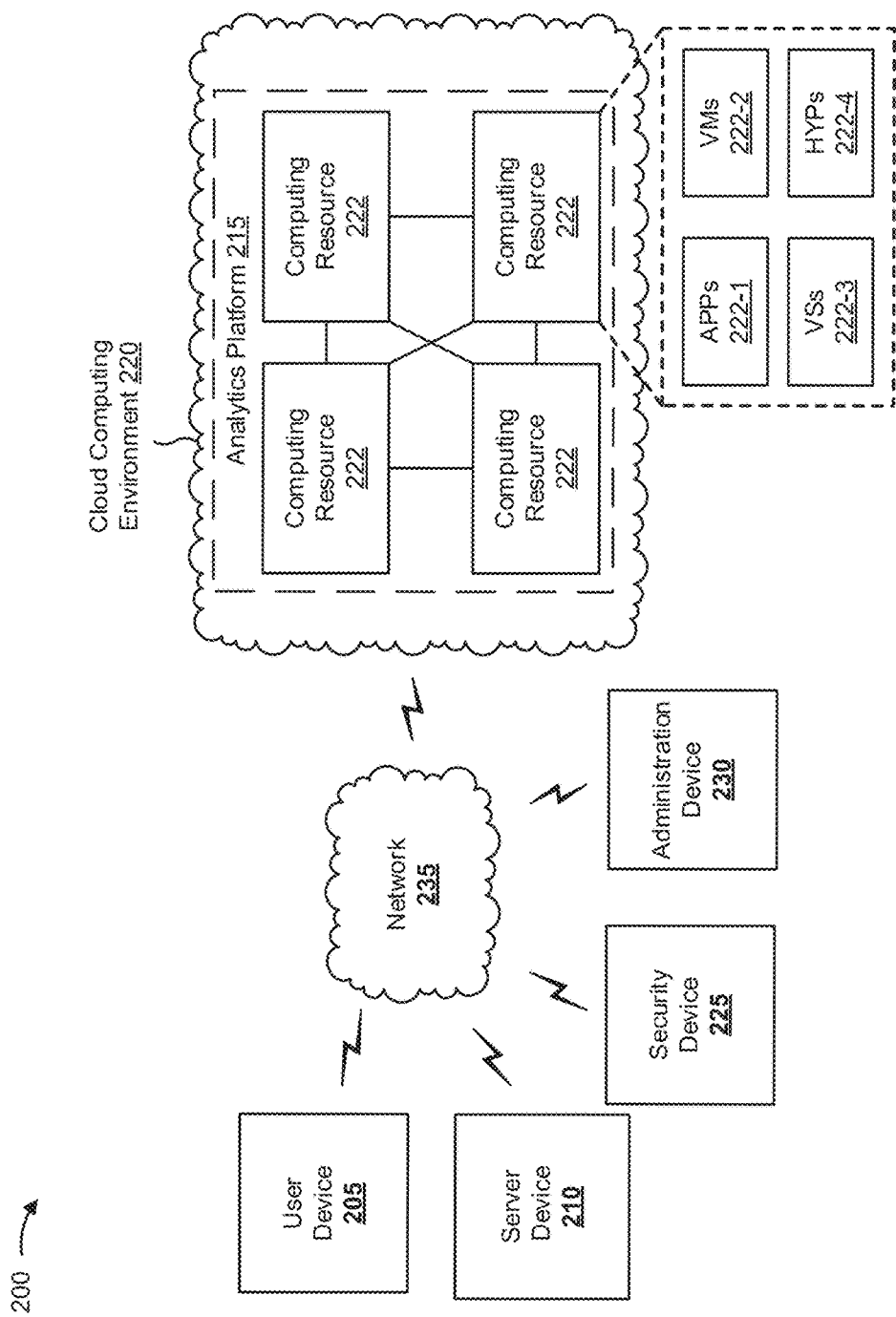
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 205, a server device 210, an analytics platform 215 implemented in a cloud computing environment 220 of computing resources 222, a security device 225, an administration device 230, and a network 235. Devices of environment 200 may interconnect via wired connections, wireless connections, or a combination of wired and wireless connections.

User device 205 includes one or more devices capable of receiving, generating, storing, processing, and/or providing information associated with respondents (e.g., test information, reports, etc.). For example, user device 205 may include a communication and/or computing device, such as a mobile phone (e.g., a smart phone, a radiotelephone, etc.), a laptop computer, a desktop computer, a tablet computer, a handheld computer, or a similar type of device.

Server device 210 includes one or more devices capable of receiving, storing, processing, and/or providing information associated with respondents (e.g., performance information, test information, etc.). For example, server device 210 may include a server, a group of servers, or a similar device. In some implementations, server device 210 may be hosted in cloud computing environment 220, as is described in more detail below.

Analytics platform 215 includes one or more devices capable of receiving, determining, processing, storing, and/or providing information associated with determination of characteristic attributes and/or predicted performance information. For example, analytics platform 215 may include a server or a group of servers. In some implementations, analytics platform 215 may host a suite of applications associated with the determination of characteristic attributes and/or predicted performance information.

In some implementations, as shown, analytics platform 215 may be hosted in cloud computing environment 220. Notably, while implementations described herein describe analytics platform 215 as being hosted in cloud computing environment 220, in some implementations, analytics platform 215 may not be cloud-based or may be partially cloud-based.

Cloud computing environment 220 includes an environment that hosts analytics platform 215. Cloud computing environment 220 may provide computation, software, data access, storage, etc. services that do not require end-user (e.g., user device 205) knowledge of a physical location and configuration of system(s) and/or device(s) that hosts analytics platform 215. As shown, cloud computing environment 220 includes a group of computing resources 222 (referred to collectively as "computing resources 222" and individually as "computing resource 222").

Computing resource 222 includes one or more personal computers, workstation computers, server devices, or another type of computation and/or communication device. In some implementations, computing resource 222 may host analytics platform 215. The cloud resources may include compute instances executing in computing resource 222, storage devices provided in computing resource 222, data transfer devices provided by computing resource 222, etc. In some implementations, computing resource 222 may communicate with other computing resources 222 via wired connections, wireless connections, or a combination of wired and wireless connections.

As further shown in FIG. 2, computing resource 222 may include a group of cloud resources, such as one or more applications ("APPs") 222-1, one or more virtual machines ("VMs") 222-2, virtualized storage ("VSs") 222-3, one or more hypervisors ("HYPs") 222-4, or the like.

Application 222-1 includes one or more software applications that may be provided to or accessed by user device 205. Application 222-1 may eliminate a need to install and execute the software applications on user device 205. For example, application 222-1 may include software associated with analytics platform 215 and/or any other software capable of being provided via cloud computing environment 220. In some implementations, one application 222-1 may send/receive information to/from one or more other applications 222-1, via virtual machine 222-2.

Virtual machine 222-2 includes a software implementation of a machine (e.g., a computer) that executes programs like a physical machine. Virtual machine 222-2 may be either a system virtual machine or a process virtual machine, depending upon use and degree of correspondence to any real machine by virtual machine 222-2. A system virtual machine may provide a complete system platform that supports execution of a complete operating system ("OS"). A process virtual machine may execute a single program, and may support a single process. In some implementations, virtual machine 222-2 may execute on behalf of a user (e.g., user device 205), and may manage infrastructure of cloud computing environment 220, such as data management, synchronization, or long-duration data transfers.

Virtualized storage 222-3 includes one or more storage systems and/or one or more devices that use virtualization techniques within the storage systems or devices of computing resource 222. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 222-4 provides hardware virtualization techniques that allow multiple operating systems (e.g., "guest operating systems") to execute concurrently on a host computer, such as computing resource 222. Hypervisor 222-4 may present a virtual operating platform to the guest operating systems, and may manage the execution of the guest operating systems. Multiple instances of a variety of operating systems may share virtualized hardware resources.

Security device 225 includes one or more devices capable of receiving, generating, storing, processing, and/or providing information associated with authentication of user device 205 and/or administration device 230. For example, security device 225 may include a server, a group of servers, or a similar device. In some implementations, security device 225 may be hosted in cloud computing environment 220.

Administration device 230 includes one or more devices capable of receiving, generating, storing, processing, and/or providing information associated with administration of a respondent evaluation process. For example, administration device 230 may include a communication and/or computing device, such as a mobile phone (e.g., a smart phone, a radiotelephone, etc.), a laptop computer, a desktop computer, a tablet computer, a handheld computer, or a similar type of device.

Network 235 includes one or more wired and/or wireless networks. For example, network 235 may include a cellular network (e.g., a long-term evolution (LTE) network, a code division multiple access (CDMA) network, a 3G network, a 4G network, a 5G network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
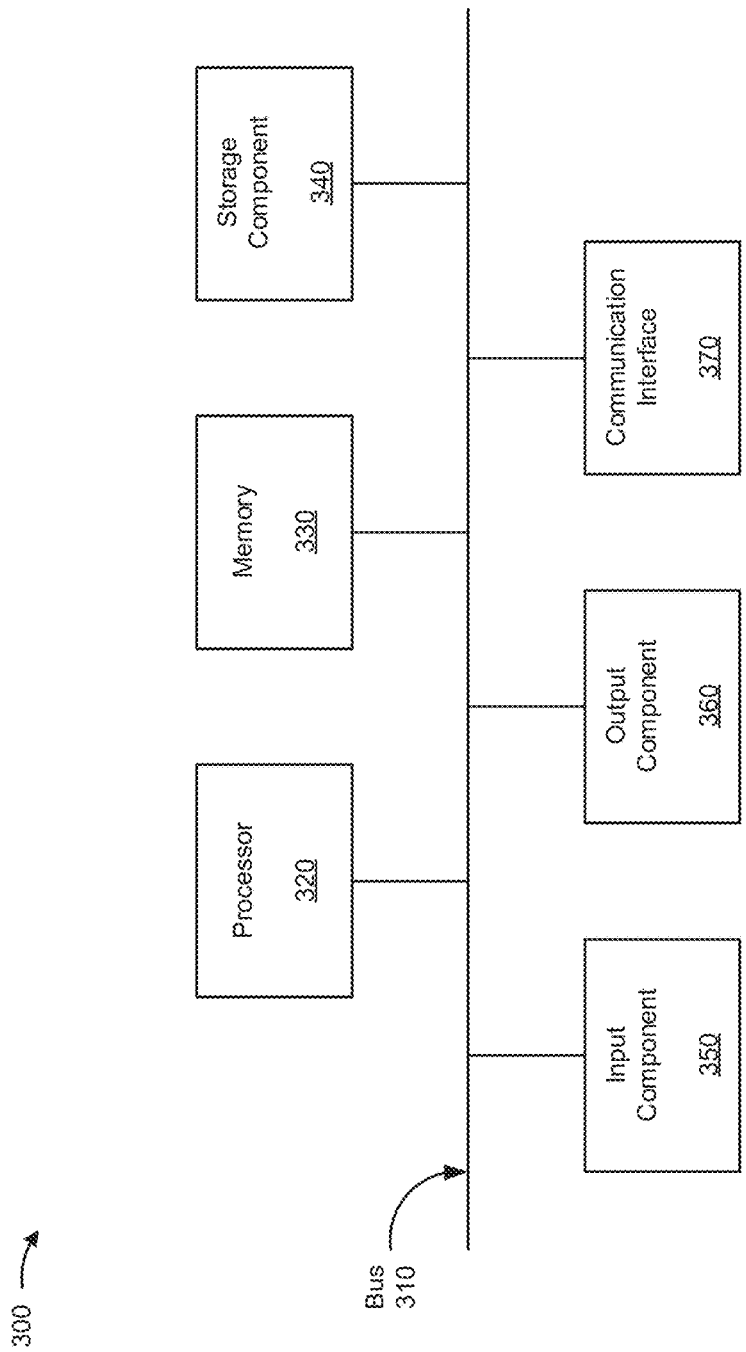
FIG. 3 is a diagram of example components of one or more devices of FIG. 2.

FIG. 3 is a diagram of example components of a device 300. Device 300 may correspond to user device 205, server device 210, analytics platform 215, computing resources 222, security device 225, and/or administration device 230. In some implementations, user device 205, server device 210, analytics platform 215, computing resources 222, security device 225, and/or administration device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
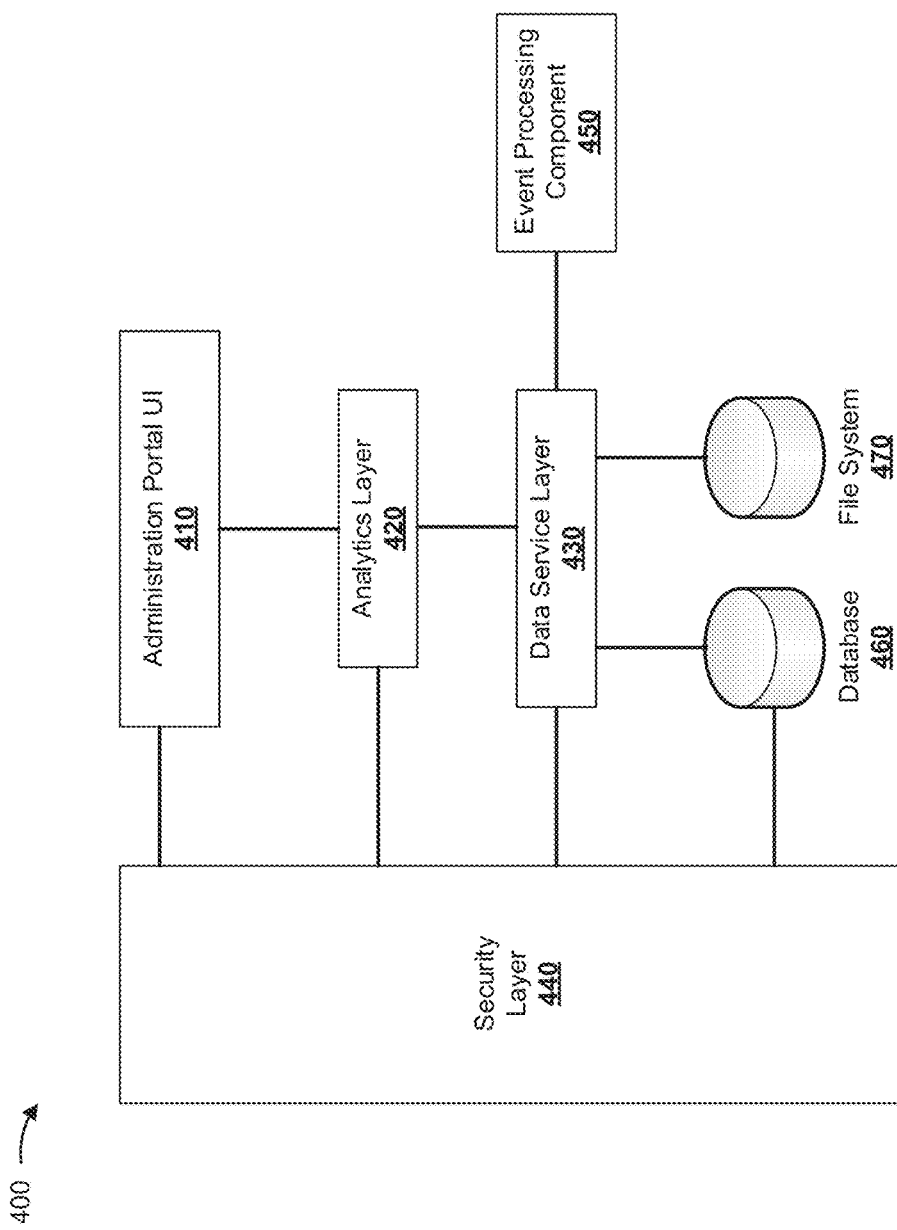
FIG. 4 is a diagram of an example implementation relating to the example process shown in FIG. 3.

FIG. 4 is a diagram of example components 400 of analytics platform 215. As shown, analytics platform 215 may be associated with an administration portal user interface (UI) 410, an analytics layer 420, a data service layer 430, a security layer 440, an event processing component 450, a database 460, and a file system 470.

Administration portal UI 410 includes one or more components that provide a user interface for administration of analytics platform 215 via administration device 230. For example, the user interface may permit a user to provide testing parameters, information regarding a company or employer associated with the respondents, demographic information, information regarding provision of tests by user device 205, or the like. Analytics platform 215 may provide the user interface to administration device 230 for display to a user of administration device 230, and may perform administration operations based on interactions with the user interface.

Analytics layer 420 includes one or more components that perform analysis operations (e.g., statistical operations, operations based on a machine learning algorithm, etc.) to identify characteristic attributes, selected respondents, and/or predicted performance information for individual respondents. In some implementations, analytics layer 420 may facilitate communication between user device 205 and administration device 230 (e.g., via email, messages, etc.). In some implementations, analytics layer 420 may validate information provided by respondents in comparison to information provided by server device 210 (e.g., demographic information, human resources information, etc.). In some implementations, analytics layer 420 may generate one or more reports based on test information, and may provide the one or more reports (e.g., via administration portal UI 410, to user device 205, etc.).

Data service layer 430 includes one or more components that perform operations related to database 460 and/or file system 470. For example, different groups of entities (e.g., a group of entities associated with a first company and a group of entities associated with a second company) may be associated with different databases 460. Data service layer 430 may manage storage and/or provision of data for different groups of entities based on the different databases 460. In some implementations, data service layer 430 may be isolated from administration portal UI 410. For example, a request for data stored by database 460 may need to be received by analytics layer 420 and authenticated based on security layer 440 before the request is provided to data service layer. This improves security of database 460.

Security layer 440 includes one or more components that provide security-related services for analytics platform 215. For example, security layer 440 may interface with security device 225. Security layer 440 may receive security information (e.g., from administration portal UI 410, analytics layer 420, data service layer 430, or database 460), and may authenticate the security information. Security layer 440 may establish a user session when the security information is authentic, and may provide a security token to a device or component associated with the security information. In some implementations, security layer 440 may perform other security-related services (e.g., inactivity timeouts, validation of security tokens associated with a user session, etc.).

Event processing component 450 includes one or more components that perform one or more time-intensive processing operations associated with data service layer 430. For example, event processing component 450 may perform mass messaging operations (e.g., email, etc.), may validate demographic information with regard to information provided by server device 210, may provide user interfaces to user devices 205, may provide reports to user device 205 and/or administration device 230, or the like.

Database 460 may store information relating to operations performed by analytics platform 215. Database 460 may define rules for storage, formatting, and access permission for data. File system 470 may identify a standard for writing files to storage (e.g., server device 210, cloud-based storage, etc.). The standard may include, for example, File Allocation Table (FAT), New Technology File System (NTFS), Extended File System (EXT2/3/4), Hierarchical File System (HFS), or another standard.

As indicated above, FIG. 4 is provided merely as an example. Other examples are possible and may differ from what was described with regard to FIG. 4.

Figure 5:
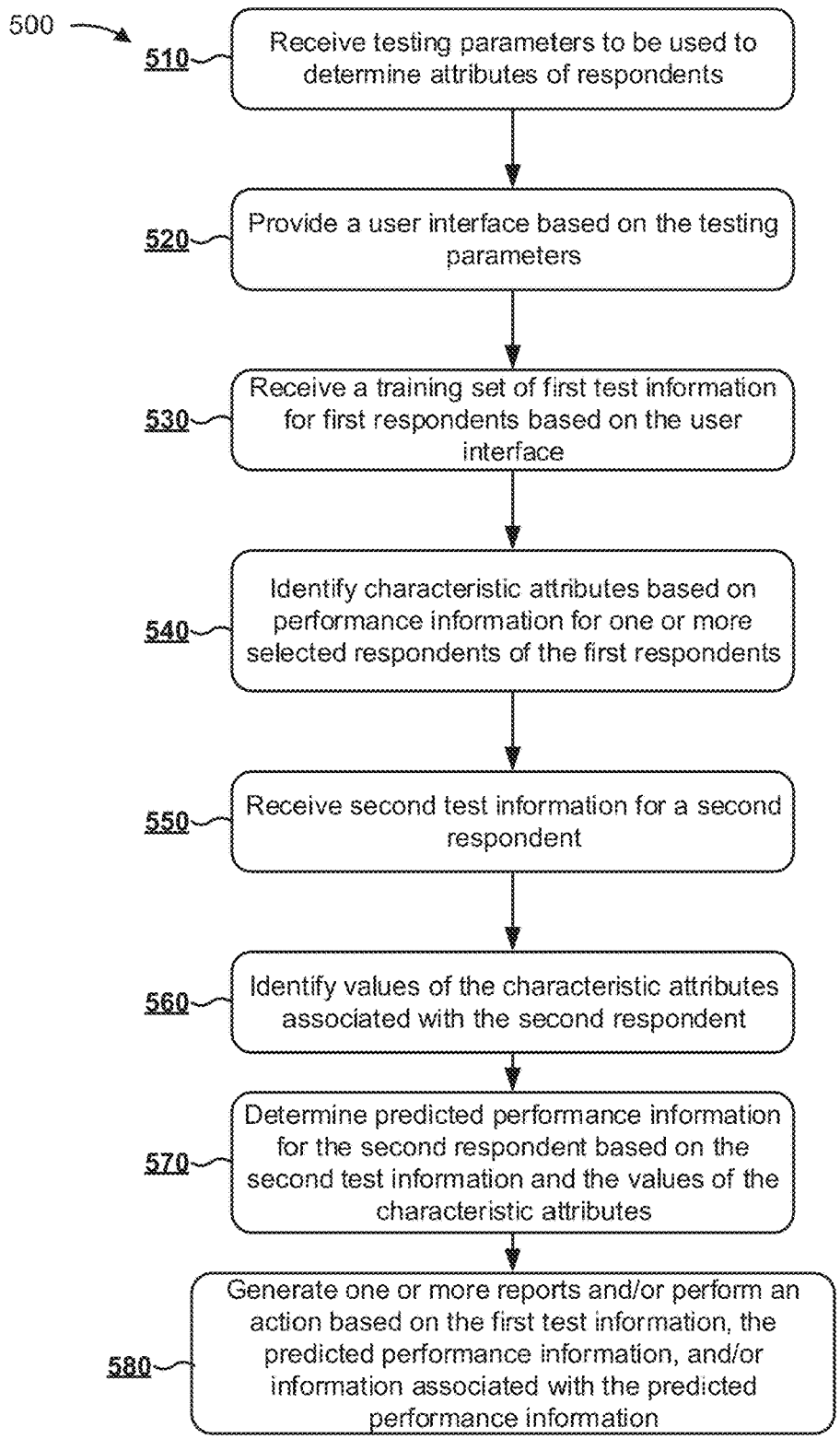
FIG. 5 is a flow chart of an example process for identifying respondent attributes based on test information.

FIG. 5 is a flow chart of an example process 500 for identifying respondent attributes based on test information. In some implementations, one or more process blocks of FIG. 5 may be performed by analytics platform 215. In some implementations, one or more process blocks of FIG. 5 may be performed by another device or a group of devices separate from or including analytics platform 215, such as user device 205, server device 210, computing resources 222, security device 225, and administration device 230.

As shown in FIG. 5, process 500 may include receiving testing parameters to be used to determine attributes of respondents (block 510). For example, analytics platform 215 may receive a set of testing parameters. The set of testing parameters may define a process for determining attributes of respondents. For example, the set of testing parameters may identify questions to be provided to respondents, and the attributes may be determined based on responses to the questions.

In some implementations, an attribute may include a personality attribute of a respondent (e.g., aggression, competitiveness, intuition, openness, etc.). A personality attribute may include a personality trait (e.g., a stable, innate personality attribute) and/or a personality state (e.g., a personality attribute that is affected by situation and context). A personality attribute may be defined based on a value associated with the personality attribute. For example, a personality attribute may be associated with a value between 1 and 5 that indicates a magnitude of the personality attribute with regard to the respondent.

In some implementations, an attribute may include a competency attribute (e.g., analytical thinking, business acumen, cultural awareness, leadership, etc.). A competency attribute may relate to a proficiency or competency of a respondent with regard to a task or occupation. A competency attribute may be defined based on a value associated with the competency attribute. For example, a competency attribute may be associated with a value between 1 and 5 that indicates a magnitude of the competency attribute with regard to the respondent.

In some implementations, an attribute may include a behavior attribute. A behavior attribute may identify how a respondent spends his or her time engaged in particular activities. A behavior attribute may be defined based on a category of activity, a particular activity, and/or a quantity of time associated with the category of activity or the particular activity. For example, the behavior attribute may identify lengths of time spent performing activities of a particular category. Additional details regarding the attributes can be found in U.S. patent application Ser. No. 12/141,247, filed Jun. 18, 2008, the entire contents of which is incorporated by reference herein.

In some implementations, the set of testing parameters may identify a test for determining attributes of respondents. For example, the test may include multiple, different questions for respondents to answer, and analytics platform 215 may determine attributes of the respondents based on answers to the multiple, different questions. In some implementations, the set of testing parameters may identify a questionnaire for other people associated with a respondent (e.g., a manager associated with a respondent, coworkers of a respondent, etc.), and analytics platform 215 may determine attributes of the respondents based on answers to questions identified by the questionnaire. For examples of tests and questionnaires, and user interfaces to provide the tests and questionnaires, refer to FIGS. 6-10.

In some implementations, analytics platform 215, or another device, may authenticate the set of testing parameters. For example, analytics platform 215 may receive the set of testing parameters from administration device 230. Analytics platform 215 may authenticate the set of testing parameters and/or a message associated with the set of testing parameters based on information provided by or associated with administration device 230. For example, administration device 230 may provide a credential (e.g., a password, a signature, a key, a cipher, etc.), and analytics platform 215 may authenticate administration device 230 based on the credential. As another example, analytics platform 215 may verify an identity of administration device 230 (e.g., based on requesting particular information from administration device 230, based on receiving a token from administration device 230, etc.).

In some implementations, analytics platform 215 may provide a credential or other information (e.g., security information) to security device 225, and security device 225 may provide information indicating whether authentication of administration device 230 is successful. For example, administration device 230 may provide security information to security device 225 as part of an onboarding or registration process for administration device 230, and security device 225 may compare the information received from analytics platform 215 to the security information to determine whether authentication of administration device 230 is successful. By authenticating administration device 230, analytics platform 215 improves security of implementations described herein and prevents malicious parties from tampering with the testing parameters.

As further shown in FIG. 5, process 500 may include providing a user interface based on the testing parameters (block 520). For example, analytics platform 215 may configure and/or provide a user interface based on the testing parameters. Analytics platform 215 may provide the user interface to user device 205 to permit user device 205 to determine test information based on the user interface. For example, user device 205 may provide the user interface to respondents (e.g., users, entities, etc.), and the respondents may specify the test information based on the testing parameters. As one possible example, the user interface may include a test or questionnaire that is generated based on the testing parameters, and may include receive user input specifying answers to the test or questionnaire. For a more detailed description of these user interfaces, refer to FIGS. 6-10, below.

In some implementations, user device 205 may provide the user interface to a user of user device 205 (e.g., a respondent or a person associated with a respondent). For example, user device 205 may provide the user interface for display. In some implementations, user device 205 may provide the user interface based on authenticating one or more credentials. For example, user device 205 may receive information identifying one or more credentials from analytics platform 215, and may require a user to input the one or more credentials before accessing the user interface. In this way, security of the user interface is improved, and incidents of unauthorized input (e.g., by a user other than an authorized user or respondent) may be reduced or eliminated.

In some implementations, analytics platform 215 may automatically generate the user interface. For example, assume that analytics platform 215 stores information identifying a set of fifty attributes. Assume further that the testing parameters identify a subset of the fifty attributes to be tested with regard to the respondent. For example, the testing parameters may identify particular attributes that are relevant to a task or profession associated with the respondent. Analytics platform 215 may generate a user interface based on the particular attributes. For example, the user interface may provide questions relevant to the particular attributes. In this way, analytics platform 215 automatically generates a customized user interface based on the testing parameters, which conserves processor and storage resources that would otherwise be used to provide a generic user interface identifying the set of fifty attributes or a user interface that is not configured to provide information regarding particular attributes.

As further shown in FIG. 5, process 500 may include receiving a training set of first test information for a plurality of respondents based on the user interface (block 530). For example, analytics platform 215 may receive first test information for a plurality of respondents from user devices 205. The first test information may be generated based on user interactions with the user interface provided by user device 205. For example, users of user device 205 may specify responses to questions or prompts provided by the user interface, and the first test information may be generated based on the responses.

The first test information may include values associated with attributes of the plurality of respondents. In some implementations, analytics platform 215 may group the first test information based on characteristics of the test information. For example, analytics platform 215 may group particular test information based on a sales function of respondents associated with the particular test information, a regional location of respondents associated with the particular test information, a gender of respondents associated with the particular test information, an age of respondents associated with the particular test information, a product line of respondents associated with the particular test information, or the like. This may permit more efficient processing of test information, as well as selective processing of only test information relevant to a particular characteristic (e.g., test information associated with a particular region, etc.), which conserves processor and storage resources that would otherwise be used to process a larger amount of test data.

In some implementations, analytics platform 215 may identify values of the attributes associated with the first respondents. Analytics platform 215 may identify the values of the attributes based on the testing parameters. For example, the testing parameters may define rules for identifying the values based on responses based on sets of responses relating to each attribute, based on combining responses relating to multiple, different attributes, or the like. Analytics platform 215 may determine the values of the attributes based on the rules. In this way, analytics platform 215 determines personality, behavior, and competency attributes of respondents based on an automated, rules-based approach, which provides a computerized process for determining information that was previously determined based on subjective intuition of a human (e.g., a manager associated with the second respondent).

In some implementations, analytics platform 215 may determine the values of the attributes based on natural language processing. For example, analytics platform 215 may receive first test information including natural language (e.g., responses to open-ended questions, statements regarding a respondent, etc.), and may perform natural language processing to identify the values of the attributes. Analytics platform 215 may identify particular objects in the first test information that are associated with particular values of characteristic attributes. For example, assume that user device 205 provides, to a particular respondent, a questionnaire question of "How willing are you to take chances" and receives a response of "I am very willing to take chances." In such a case, analytics platform 215 may use natural language processing to identify the set of words "very willing," and may assign a numerical value based on the set of words. In this way, analytics platform 215 determines values of attributes based on natural language processing, which improves versatility of analytics platform 215, reduces preprocessing required to process the first test information, and reduces subjective human involvement in processing of the first test information.

The first test information may be included in a training set of test information. For example, the first test information received from the plurality of respondent may be used as a training set for a predictive model to predict performance of respondents. Analytics platform 215 may train the predictive model based on the training set of first test information, and based on performance information corresponding to the plurality of respondents, as described in connection with block 540, below.

In some implementations, analytics platform 215 may validate the first test information. For example, analytics platform 215 may identify a threshold value of consecutive identical responses (e.g., ten consecutive identical responses, thirty consecutive identical responses, etc.), and may remove consecutive identical responses that satisfy the threshold value. This may reduce an impact of test information associated with respondents who selected a particular response for each question to complete the test as quickly as possible.

As another example of validating first test information, analytics platform 215 may process a missing test response. For example, analytics platform 215 may determine a value of a missing test response based on values of related test responses (e.g., other test responses regarding the same attribute as the missing test response). Additionally, or alternatively, analytics platform 215 may discard test information for a particular respondent based on determining that the test information is incomplete or includes a threshold quantity of consecutive identical responses.

As yet another example of validating first test information, analytics platform 215 may determine that a value of test information is improbable or impossible, and may process the test information accordingly. For example, analytics platform 215 may determine that a respondent has provided information indicating that the respondent works 200 hours in an average week (i.e., a quantity of hours greater than the quantity of hours in a week). In such a case, analytics platform 215 may cause the respondent to adjust the specified value, may discard the test information, may provide a notification to administration device 230, or the like. As another example, analytics platform 215 may compare test information to performance information for a particular respondent, and may determine whether discrepancies exist between the test information and the performance information (e.g., based on a respondent specifying a quantity of hours worked that differs from a value specified in the performance information). In such a case, analytics platform 215 may discard the test information associated with the respondent, may provide a notification to administration device 230, may replace the test information with the value identified by the performance information, or the like.

In some implementations, analytics platform 215 may assign a weight to one or more responses of the first test information. For example, assume that a particular entity is to be evaluated based on the second test information. In such a case, the first test information may include information provided by the particular entity, as well as information provided by other entities associated with the particular entity (e.g., managers, coworkers, friends, etc.). Analytics platform 215 may assign weights to values included in the first test information based on the relationships between the individual and the people. For example, analytics platform 215 may assign a higher weight to responses associated with people who work closely with the particular entity than to people who do not work with the particular entity. In this way, analytics platform 215 adjusts values of test information based on likelihood of accuracy of the test information, which reduces the effects of bias on the test information and improves accuracy of the predicted performance information.

As further shown in FIG. 5, process 500 may include identifying characteristic attributes and performance information for one or more selected respondents of the plurality of respondents (block 540). For example, analytics platform 215 may identify characteristic attributes of selected respondents. A characteristic attribute is an attribute that is correlated with a status of respondents as selected respondents. For example, the selected respondents may be associated with better performance than other respondents, and the selected respondents may tend to be associated with particular values of particular attributes. In such a case, the particular attributes may be identified as characteristic attributes.

By identifying characteristic attributes and values associated with the characteristic attributes of the selected respondents, analytics platform 215 enables quantitative comparison of non-selected respondents to the selected respondents. For example, when the selected respondents are high-performing workers, it may be beneficial to compare attributes of other workers to the high-performing workers to identify areas of improvement, incompatible attributes, suitable positions for the other workers, or the like. Whereas a human manager may perform this comparison subjectively (e.g., based on the manager's subjective impressions of what constitutes characteristic attributes of a high-performing worker), implementations described herein permit identification of these attributes based on a rules-based process that a human cannot perform when comparing the respondents (e.g., a machine learning process). This, in turn, may improve efficiency of allocation of training resources and human resources, and may permit analytics platform 215 to automatically assign training actions, automatically generate informative reports regarding the respondents, or the like.

In some implementations, analytics platform 215 may obtain the performance information from server device 210. The performance information may identify performance of the plurality of respondents with regard to one or more metrics. For example, when the respondents include salespersons, the performance information may relate to sales performance (e.g., in terms of revenue, quantity of sales, percentage of inventory sold, etc.). In some implementations, analytics platform 215 may obtain only performance information associated with the plurality of respondents based on having received test information associated with the plurality of respondents. By obtaining performance information associated with the plurality of respondents, rather than performance information associated with other entities, analytics platform 215 conserves processor and storage resources that would otherwise be used to obtain performance information for other entities (e.g., entities who did not complete the test or provide useful test information).

In some implementations, analytics platform 215 may identify the selected respondents based on the performance information. For example, analytics platform 215 may obtain performance information for each respondent of the plurality of respondents. Analytics platform 215 may identify the selected respondents based on values of the performance information associated with the selected respondents. For example, the selected respondents may be associated with performance information values that satisfy a threshold. As another example, the selected respondents may be associated with performance information values that exceed an average value by a particular amount. As yet another example, the selected respondents may be associated with higher performance information values than the other respondents (e.g., analytics platform 215 may rank respondents based on the performance information values, and may select the selected respondents from the highest-ranked respondents). In a sales context, the selected respondents may include respondents that are associated with sales performance that satisfies a threshold. In some implementations, analytics platform 215 may identify the selected participants based on an input identifying the selected participants (e.g., based on a user input).

In some implementations, analytics platform 215 may identify multiple categories of respondents. For example, analytics platform 215 may identify a category of high performing respondents, a category of low performing respondents, and a category of average performing respondents. In such a case, analytics platform 215 may identify characteristic attributes corresponding to each of the multiple categories. In some implementations, analytics platform 215 may not identify characteristic attributes for a particular category. For example, analytics platform 215 may determine characteristic attributes of high performing respondents and of low performing respondents, and may not determine characteristic attributes of the average performing respondents. In this way, analytics platform 215 conserves processor resources that would be used to determine characteristic attributes of the average performing respondents, while permitting analysis of the characteristic attributes of high performing respondents and low performing respondents.

In some implementations, analytics platform 215 may identify the characteristic attributes based on an analysis technique. This analysis technique may include one or more of a discriminant analysis, a logistic regression, or a T test, which are described in turn below. In some implementations, analytics platform 215 may identify or verify the characteristic attributes based on another test, such as a variance inflation factor (VIF) test, an information value test, or another statistical approach.

A discriminant analysis test may identify a linear combination of attributes that characterizes or separates two or more classes of respondents. A discriminant analysis test may use a classification variable (i.e., whether a respondent is a selected respondent) and a set of measurement variables (i.e., values associated with attributes of respondents). The discriminant analysis test may receive, as input, the classification variable and the set of measurement variables, and may output a function that identifies particular combinations of values of attributes that are predictors of classification of a respondent as a selected respondent or a non-selected respondent. Based on the particular combinations of values of attributes, analytics platform 215 may identify the characteristic attributes. For example, analytics platform 215 may identify a particular combination of attributes associated with the selected respondents as the characteristic attributes.

A logistic regression technique is a regression analysis in which the dependent variable (e.g., the classification of respondents as selected respondents or non-selected respondents) is categorical. Analytics platform 215 may perform the logistic regression technique to identify a combination of attributes that are likely to correctly predict a classification of a respondent as a selected respondent or a non-selected respondent. For example, analytics platform 215 may use the attributes as independent variables and the classification of respondents as dependent variables in a least squares analysis. Analytics platform 215 may identify a particular combination of attributes and/or values of attributes as characteristic attributes based on the combination of attributes and/or values of attributes being likely to identify a respondent as a selected respondent.

A T test is a statistical hypothesis test in which the test statistic (e.g., a respondent's status as a selected respondent or a non-selected respondent) follows a Student's t-distribution under the null hypothesis, and can be used to determine whether two sets of data are significantly different from each other. The T test may be used to determine a slope of a regression line, wherein the regression line is based on a set of independent variables (e.g., values of attributes) and a dependent variable (e.g., selected respondents and non-selected respondents). By determining the slope of the regression line, analytics platform 215 may identify correlations between attribute values and selected respondents, and may thereby identify characteristic attributes.

In some implementations, analytics platform 215 may train a predictive model based on the test information and the performance information. For example, analytics platform 215 may train the predictive model based on a machine learning algorithm, a neural network process, an artificial intelligence technique, or the like. The predictive model may receive, as input, information identifying respondents (e.g., individual respondents) and test information associated with the respondents. The predictive model may output predicted performance information associated with the respondents and/or a classification of the respondents as selected respondents or non-selected respondents. Analytics platform 215 may train the predictive model based on a training set of test information and performance information associated with a set of respondents (e.g., selected respondents and/or non-selected respondents) to identify a relationship between attributes of the set of respondents and classification of the set of respondents as selected respondents or non-selected respondents. In this way, analytics platform 215 performs a well-defined rules-based process to automate a task that was previously performed by a human based on subjective intuition of the human (e.g., determining predicted performance information based on personality attributes, behavior attributes, and/or competency attributes). Further, analytics platform 215 creates a quantifiable output identifying the predicted performance information, thus permitting further analysis, In some implementations, analytics platform 215 may update the predictive model. For example, assume that analytics platform 215 uses the predictive model to identify predicted performance information for a set of respondents. Analytics platform 215 may receive observed performance information for the set of respondents, and may adjust or update the predictive model based on comparing the observed performance information and the predicted performance information. For example, analytics platform 215 may adjust a relationship between attributes of the set of respondents and predicted performance information. In this way, analytics platform 215 adjusts the predictive model based on observed information, which improves accuracy of the predictive model and allows adaptation to changing correlations between attributes and performance information.

As further shown in FIG. 5, process 500 may include receiving second test information for a second respondent (block 550). For example, analytics platform 215 may receive second test information for a second respondent. In some implementations, analytics platform 215 may receive second test information for multiple, different second respondents. In some implementations, analytics platform 215 may receive the second test information from user device 205 based on the second respondent completing a test via a user interface provided by user device 205 (e.g., a user interface similar to those described in connection with block 520, above).

In some implementations, analytics platform 215 may receive the second test information via a secure connection (e.g., a secure session, etc.) that may be established based on security information associated with user device 205. For example, user device 205 may provide security information to establish a secure connection, and analytics platform 215 may establish the secure connection based on validating or authenticating the security information (e.g., based on providing the security information to security device 225 for validation or authentication). In this way, analytics platform 215 improves security of the second test information.

As further shown in FIG. 5, process 500 may include identifying values of the characteristic attributes associated with the second respondent (block 560). For example, analytics platform 215 may identify values of the characteristic attributes associated with the second respondent. Analytics platform 215 may identify the values of the characteristic attributes based on the testing parameters. For example, the testing parameters may define rules for identifying the values based on responses. Analytics platform 215 may determine the values of the characteristic attributes based on the rules. In this way, analytics platform 215 determines personality, behavior, and competency attributes of respondents based on an automated, rules-based approach, which provides a computerized process for determining information that was previously determined based on subjective intuition of a human (e.g., a manager associated with the second respondent.

In some implementations, analytics platform 215 may determine the values of the characteristic attributes based on natural language processing. For example, analytics platform 215 may receive second test information including natural language (e.g., responses to open-ended questions, statements regarding a respondent, etc.), and may perform natural language processing to identify the values of the characteristic attributes. Analytics platform 215 may identify particular objects in the second test information that are associated with particular values of characteristic attributes. In this way, analytics platform 215 determines values of characteristic attributes based on natural language processing, which improves versatility of analytics platform 215, reduces preprocessing and validation required to process the second test information, and reduces subjective human involvement in processing of the second test information.

As further shown in FIG. 5, process 500 may include determining predicted performance information for the second respondent based on the second test information and/or the values of the characteristic attributes (block 570). For example, analytics platform 215 may determine predicted performance information for the second respondent based on the second test information and/or the values of the characteristic attributes of the selected respondents. In some implementations, analytics platform 215 may determine a predicted classification of the second respondent as a selected respondent or a non-selected respondent.

In some implementations, analytics platform 215 may determine the predicted performance information and/or the predicted classification based on the predictive model. For example, analytics platform 215 may input, to the model, the second test information associated with the second respondent. The model may output the predicted performance information and/or the predicted classification. In this way, analytics platform 215 determines predicted performance information based on the second test information, which allows quantitative analysis of attributes of respondents to determine predicted performance or classification of the respondents.

In some implementations, analytics platform 215 may identify differences in attribute values between the second respondent and the characteristic attributes. For example, analytics platform 215 may identify particular attribute values of the second respondent that, if improved, may improve performance of the second respondent. As another example, analytics platform 215 may identify particular attribute values that indicate that the second respondent is unlikely to be a selected respondent. As yet another example, analytics platform 215 may identify a particular task, role, or team for which the second respondent is suited based on the second test information, and may provide a recommendation to assign the second respondent to the particular task, role, or team.

As further shown in FIG. 5, process 500 may include generating one or more reports and/or performing an action based on the predicted performance information and/or information associated with the predicted performance information (block 580). For example, analytics platform 215 may store or provide the predicted performance information and/or information associated with the predicted performance information. In some implementations, analytics platform 215 may provide the predicted performance information and/or information associated with the predicted performance information to user device 205 (e.g., for display to a user, for storage, etc.). In some implementations, analytics platform 215 may provide the predicted performance information and/or information associated with the predicted performance information to server device 210 (e.g., for storage, etc.)

In some implementations, analytics platform 215 may generate a report based on the plurality of respondents and/or the individual respondent. A report may identify information regarding the second respondent in comparison to the first respondents. For example, the report may identify predicted performance information associated with a second respondent. As another example, the report may identify a value of a characteristic attribute associated with the second respondent and one or more values of the characteristic attribute associated with the first respondents. As yet another example, the report may indicate whether the second respondent is predicted to be a selected respondent or a non-selected respondent. For a more detailed description of such reports, refer to the description of FIGS. 11-14, below.

In some implementations, analytics platform 215 may generate a report identifying characteristic attributes of the selected respondents and/or the non-selected respondents, and identifying values associated with the characteristic attributes for the selected respondents and/or the non-selected respondents. For example, the report may identify a set of characteristic attributes, and may identify values of the characteristic attributes associated with the selected respondents and/or the non-selected respondents. For an example implementation of a report identifying values of characteristic attributes for selected respondents and non-selected respondents, refer to the description of FIG. 11, below.

In some implementations, analytics platform 215 may generate a report identifying values of characteristic attributes for a second respondent. For example, the report may identify a set of characteristic attributes, may identify respective values associated with the first respondents, and may identify values, of the set of characteristic attributes, associated with the second respondent. In some implementations, the report may include textual explanations of the characteristic attributes (e.g., explanations of behavior that would improve performance of the second respondent with regard to the characteristic attributes, explanation of meanings of the characteristic attributes, etc.). For an example implementation of a report identifying values of characteristic attributes for a second respondent, refer to the description of FIG. 12, below.

In some implementations, analytics platform 215 may generate a report based on activities performed by the first respondents and the second respondent. For example, the report may identify time spent performing particular tasks, a distribution of time spent per task, or the like. The report may provide this information with regard to the first respondents and the second respondents. For example, the report may compare time spent performing particular tasks by the second respondent to an average time spent performing the particular tasks by the first respondents. For an example implementation of a report identifying activities performed by the first respondents and the second respondent, refer to the description of FIG. 13, below.

In some implementations, analytics platform 215 may generate a report that provides grouped values of characteristic attributes for first respondents and/or second respondents. For example, the report may provide values of characteristic attributes that are grouped based on regions associated with the corresponding respondents. As another example, the report may provide values of characteristic attributes that are grouped based on sales functions associated with the corresponding respondents. As yet another example, the report may provide values of characteristic attributes that are grouped based on product lines associated with the corresponding respondents. For an example implementation of a report that provides grouped values of characteristic attributes, refer to the description of FIG. 14, below.

In some implementations, analytics platform 215 may train a predictive model based on the predicted performance information. For example, analytics platform 215 may store the predicted performance information, and may obtain observed performance information associated with the second respondent. The observed performance information may correspond to actual performance of the second respondent. For example, the observed performance information may be determined based on sales performance of the second respondent, a second set of test information provided by the second respondent (e.g., after a first set of test information is used to determine the predicted performance information), or the like.

Analytics platform 215 may update the predictive model based on comparing the predicted performance information to the observed performance information. For example, analytics platform 215 may adjust parameters for determining predicted performance information so that the predicted performance information, when generated by the predictive model, more closely resembles the observed performance information. In some implementations, analytics platform 215 may update the predictive model based on a machine learning algorithm, a neural network algorithm, a linear regression approach, a logarithmic regression analysis, or the like.

In some implementations, analytics platform 215 may cause an action to be performed, or may perform another action. For example, analytics platform 215 may determine that one or more second respondents are to be reassigned (e.g., to a different region, a different product line, etc.), and may provide information indicating that the one or more second respondents are to be reassigned. As another example, analytics platform 215 may provide a message to user devices 205 associated with the one or more second respondents, or may schedule a meeting with regard to the user devices 205. As yet another example, analytics platform 215 may generate a ranked list of characteristic attributes (e.g., characteristic attributes that most need improvement, etc.), and may provide training materials to the one or more second respondents based on the ranked list of characteristic attributes. As still another example, analytics platform 215 may add the second test information for the second respondent to a corpus of test information for training the predictive model.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is an example of a user interface 600 for determining personality attributes associated with a respondent. As shown, questions 602 may be phrased to ask the respondent about his or her behaviors, characteristics, and how they see themselves, while other items may ask about how they see other people. In some implementations, the questions presented (regardless of whether they are applicable to personality, behavior or competency) may be selected to be culturally desensitized (e.g., by removing slang, jargon, etc.), thereby broadening applicability to the widest possible audience and allowing people from different cultures to understand the meaning of each question, regardless of the language in which each question is presented. In this manner, the answers to the personality assessment questions contribute to an understanding of the respondent's personal qualities as they relate to various dimensions of sales, leadership, and elements of corporate culture and work environment.

As shown, a response scale 604 may be used to measure the respondent's answers. In the illustrated example, a 4-point scale, from "Strongly Disagree" to "Strongly Agree," is provided for each question. In some implementations, other response scales and/or different question formats (e.g., multiple choice, true-false, etc.) may be employed for this purpose. Furthermore, in the illustrated example, all questions may be deemed mandatory and must be answered before the respondent can continue with the survey. In some implementations, lesser portions of a given set of question could be mandatory, with the balance being deemed optional, as a matter of design choice. To assist the respondent, a percentage bar 606 is provided that allows the respondent to track his or her progress in completing the personality assessment.

As indicated above, FIG. 6 is provided merely as an example. Other examples are possible, and may differ from what was provided with regard to FIG. 6.

FIG. 7 is an example user interface 700 for determining test information based on input from respondents associated with a person to be assessed. As shown, user interface 700 may include various options 702 that allow the respondent to identify his or her relationship with the person being assessed. Similarly, familiarity options 704 may be provided that allow the respondent to specify how familiar he or she is with the person being assessed. When a respondent identifies his or her relationship as "Self," the familiarity options may be disabled.).

In some implementations, the selections from the relationship options 702 and familiarity options 704 may be used to establish a weighting factor that is representative of the degree to which the respondent's assessment data should be incorporated into an individual's overall assessment. For example, test information provided by customers may not be weighted as highly as test information associated with superiors or peers, for example, since it can be assumed that someone choosing customers would only choose those that are inclined to favorably assess the individual being evaluated. Note that, although particular relationship options 702 and familiarity options 704 are illustrated in FIG. 7, other relationships or familiarity expressions may be used depending on a variety of factors, including the particular context and the organization being assessed.

As indicated above, FIG. 7 is provided merely as an example. Other examples are possible, and may differ from what was described with regard to FIG. 7.

Figure 8:
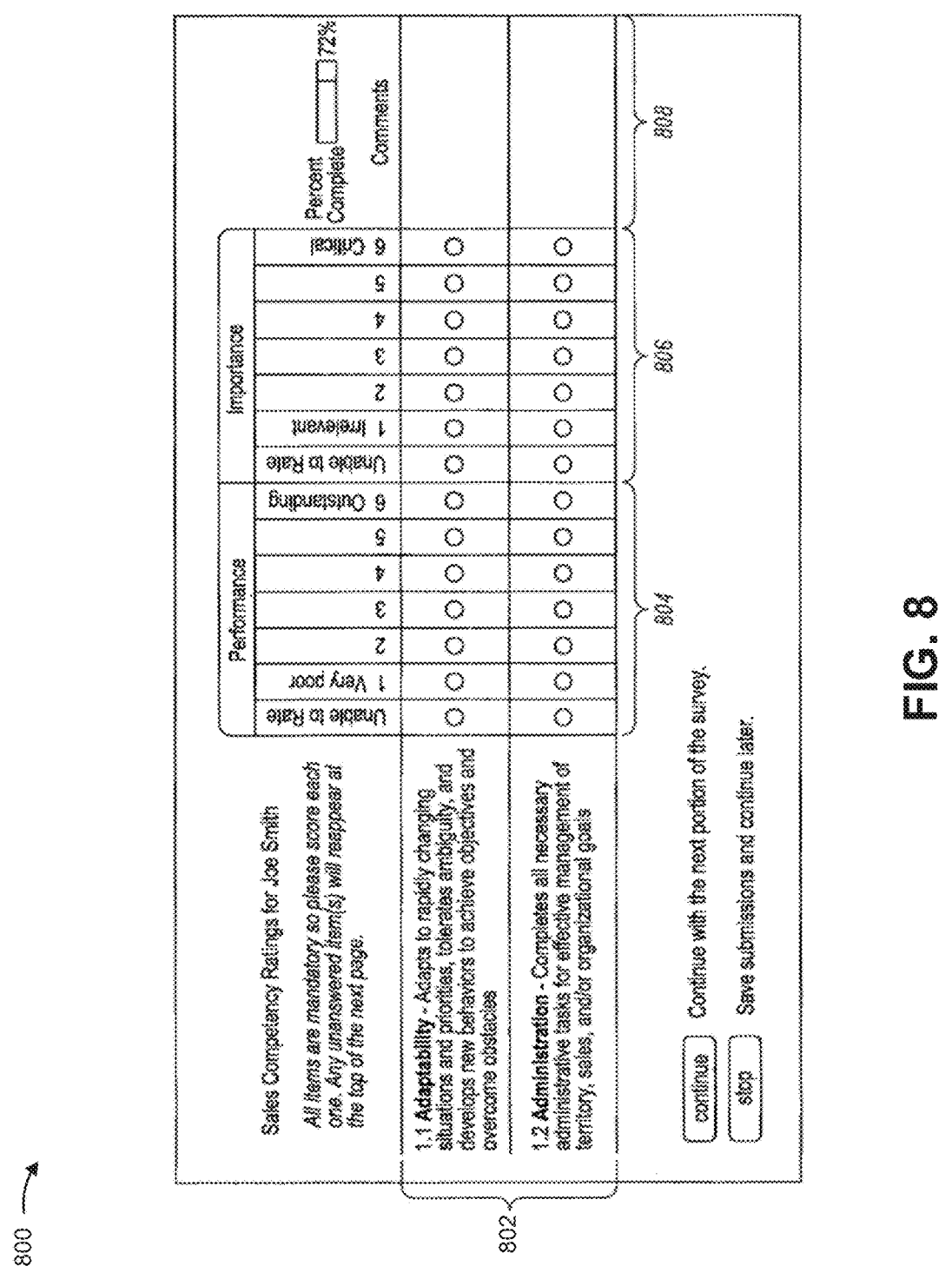

FIG. 8 is an example user interface 800 for determining test information based on input from respondents associated with a person to be assessed. As shown in FIG. 8, a plurality of questions 802 are provided. Each of the competency assessment questions 802 may be rated in two ways: according to a performance scale 804 and an importance scale 806. In the illustrated example, performance is rated on a 6-point scale 804, from a rating of 1 ("Very Poor") to 6 ("Outstanding"). The respondent may evaluate the person's current performance concerning the specific competency under consideration. If the respondent is unable to rate the performance of the person with regards to the competency in question, he, or she can select an "Unable to Rate" button. As further shown in the illustrated example, a level of importance of a particular competency is rated on a 6-point scale 806, from a rating of 1 ("Irrelevant") to 6 ("Critical"). When completing the importance ratings, the respondent may evaluate how important the competency under consideration is with regard to the person's role as a sales representative or sales manager. Once again, if the respondent is unable to rate the level of importance of the competency in question as it relates to the person's role, he or she may select the "Unable to Rate" button. Finally, a comment section 808 may be provided for each question 802. The comments section 808 may allow the respondent to explain his or her ratings, particularly if the rating of the individual is particularly critical or favorable. Comments can provide the individual being assessed with an understanding of what needs to be done differently to improve performance. Comments can be analyzed and/or included in reports to show specific themes for each individual as well as the aggregate sales organization.

As indicated above, FIG. 8 is provided merely as an example. Other examples are possible, and may differ from what was described with regard to FIG. 8.

Figure 9:
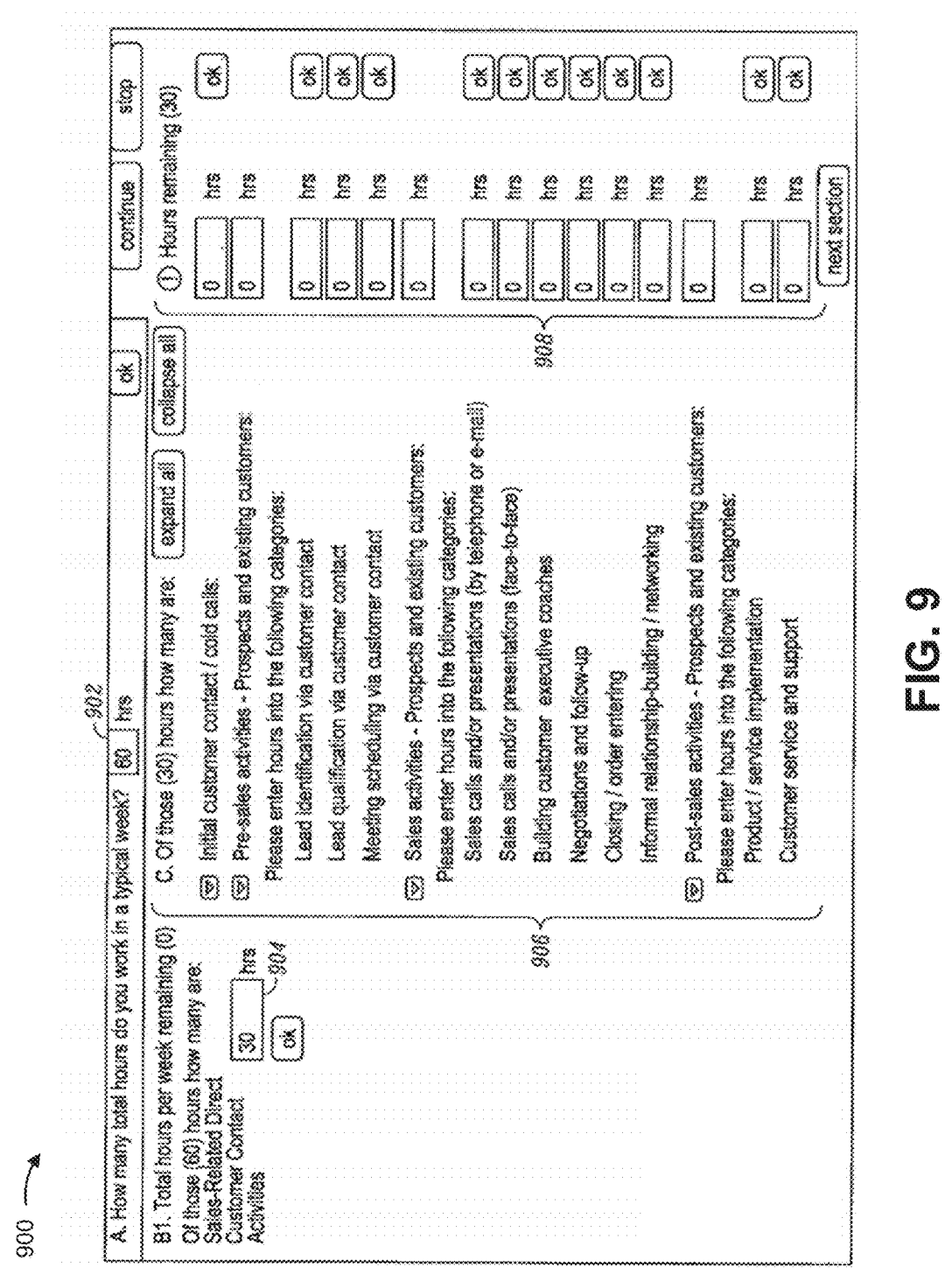

FIG. 9 is an example user interface 900 for determining test information (e.g., behavior attributes) associated with a respondent. FIG. 9 illustrates an example including a total time entry field 902 and, in this example, one category-specific time entry field 904. Completion of this time entry field 904 may cause provision, for display, of additional questions 906 that require the respondent to further specify the number of hours he or she works on specific activities using the activity time entry fields 908.

As indicated above, FIG. 9 is provided merely as an example. Other examples are possible, and may differ from what was described with regard to FIG. 9.

FIG. 10 is an example of a user interface 1000 for determining test information (e.g., behavior attributes) associated with a respondent. As shown, a variety of question 1002 may be provided that can be answered, in this example, using pre-populated pull down menus 1004. In some implementations, other input mechanisms, such as buttons, etc. may be employed in place of or in conjunction with the pull down menus 1004.

In some implementations, a staged approach to collecting test information and demographic information may be used. That is, specific portions of respondent demographic data may be collected contemporaneously with respondent's test information. In this staged approach, the complete personality assessment portion may be obtained first, followed by the competency and behaviors portions in sequence.

In some implementations, it may be necessary for the respondent to first complete the demographic data capture portion before being allowed to answer any of the assessment (personality, competency and/or behavior) portions. In this way, a respondent's demographics can be correlated with all of the assessments the respondent has completed. That is, in case a respondent fails to complete one or more of the assessments, the collected demographics data may still be used when processing that portion of the assessments that were completed. As such, valuable data may be preserved for use even if the entire process is not completed.

Figure 11:
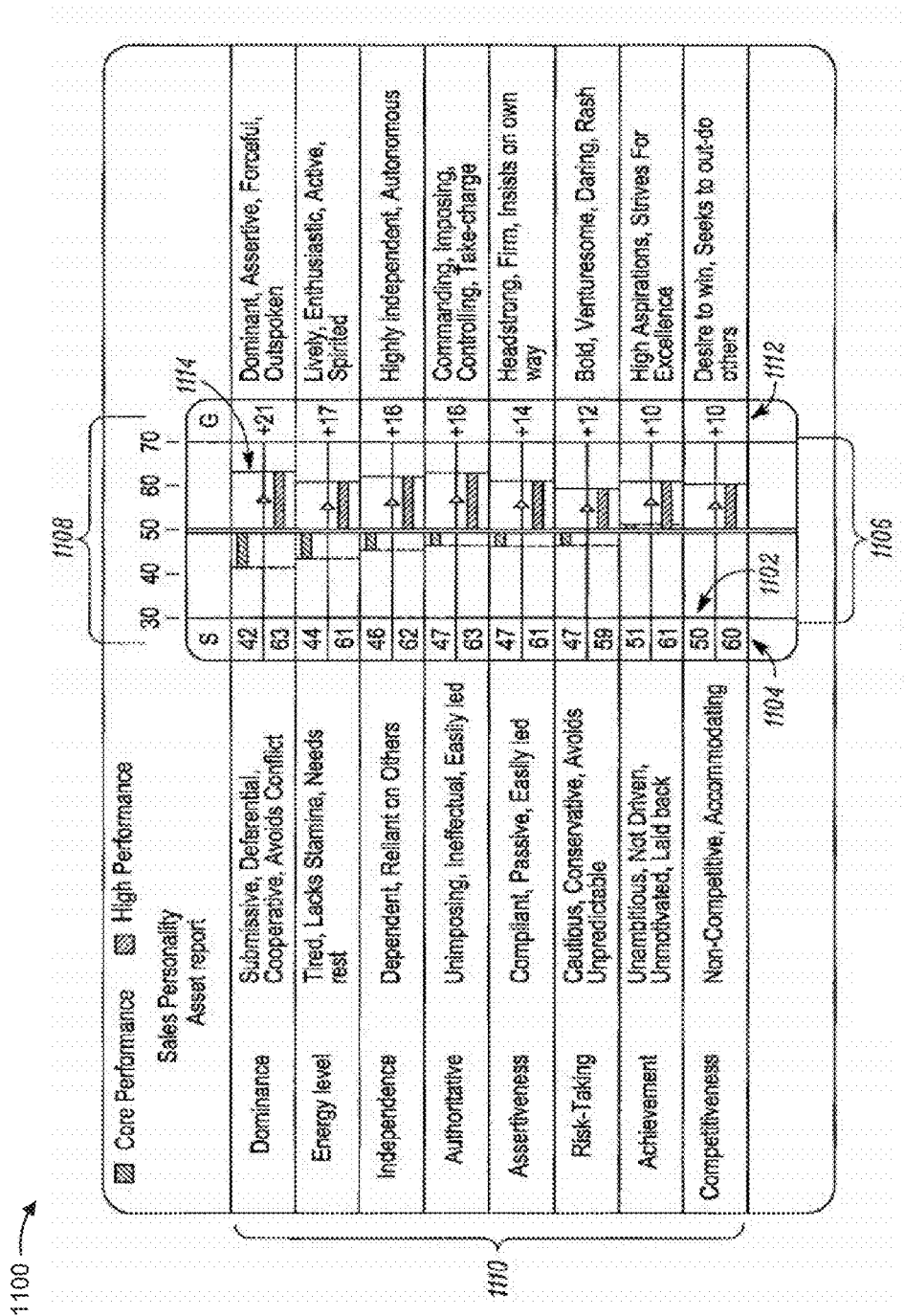

FIG. 11 is an example user interface 1100 for a report generated based on test information (e.g., personality attributes of test information). As shown, both the respondent's personality assessment data 1102 and selected respondent benchmark data 1104 (e.g., characteristic attributes, as illustrated by the left-hand score column) are illustrated in numerical form. As further shown, bar charts 1106 illustrating the respective individual and high sales performer scores (relative to an absolute scoring scale 1108) for each personality aspect 1110 may be provided to visually illustrate the differences. As shown, a gap score 1112 (right-hand score column) may be provided to clearly indicate the differences between the individual respondent's scores and selected respondent scores. The gap scores 1112 may also be indicated visually, in the illustrated example, by an interval delineated by a dotted vertical line 1114 (corresponding to the individual respondent's score) and a solid vertical line (corresponding to the selected respondent score) with a directional arrow indicating the polarity of the gap score (right-facing arrow indicating the individual's score lags the selected respondent score; left-facing arrow indicating the individual's score leads the selected respondent score).

As indicated above, FIG. 11 is provided merely as an example. Other examples are possible, and may differ from what was described with regard to FIG. 11.

Figure 12:
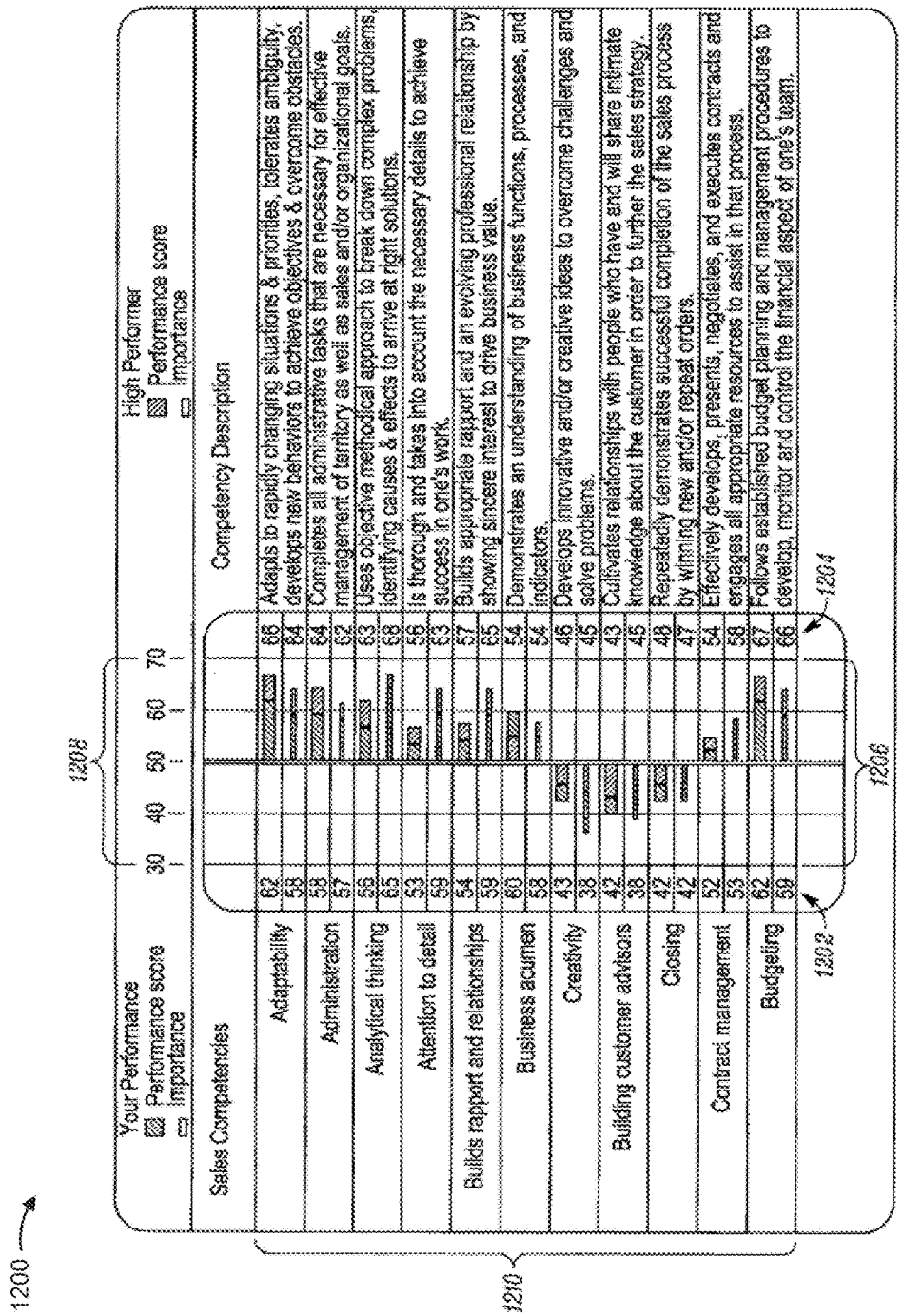

FIG. 12 is an example user interface 1200 for a report generated based on test information concerning an individual respondent's competency assessment data 1202 (left-hand score column) as compared to selected respondent benchmark data 1204 (right-hand score column). As shown, the individual and high sale performer competency assessment data 1202, 1204 is further broken down according to the performance and importance ratings described above. Bar charts 1206 illustrating the respective individual and high sales performer scores (relative to an absolute scoring scale 1208) for each competency 1210 are also provided to visually illustrate the scoring gaps. In the illustrated example, performance scores are illustrated using thicker bars, whereas importance scores are illustrated using thinner bars, although any convenient graphical illustration method could be employed for this purpose. User interface 1200 in this example uses a different format for visually illustrating the gap scores as compared to that used in FIG. 11 (e.g., overlaid bars versus interval lines and directional arrows). Either or both techniques (or still other techniques not shown) may be employed in any of the displays illustrated herein as a matter of design choice, and that the instant disclosure is not limited in this regard.

As indicated above, FIG. 12 is provided merely as an example. Other examples are possible, and may differ from what was described with regard to FIG. 12.

Figure 13:
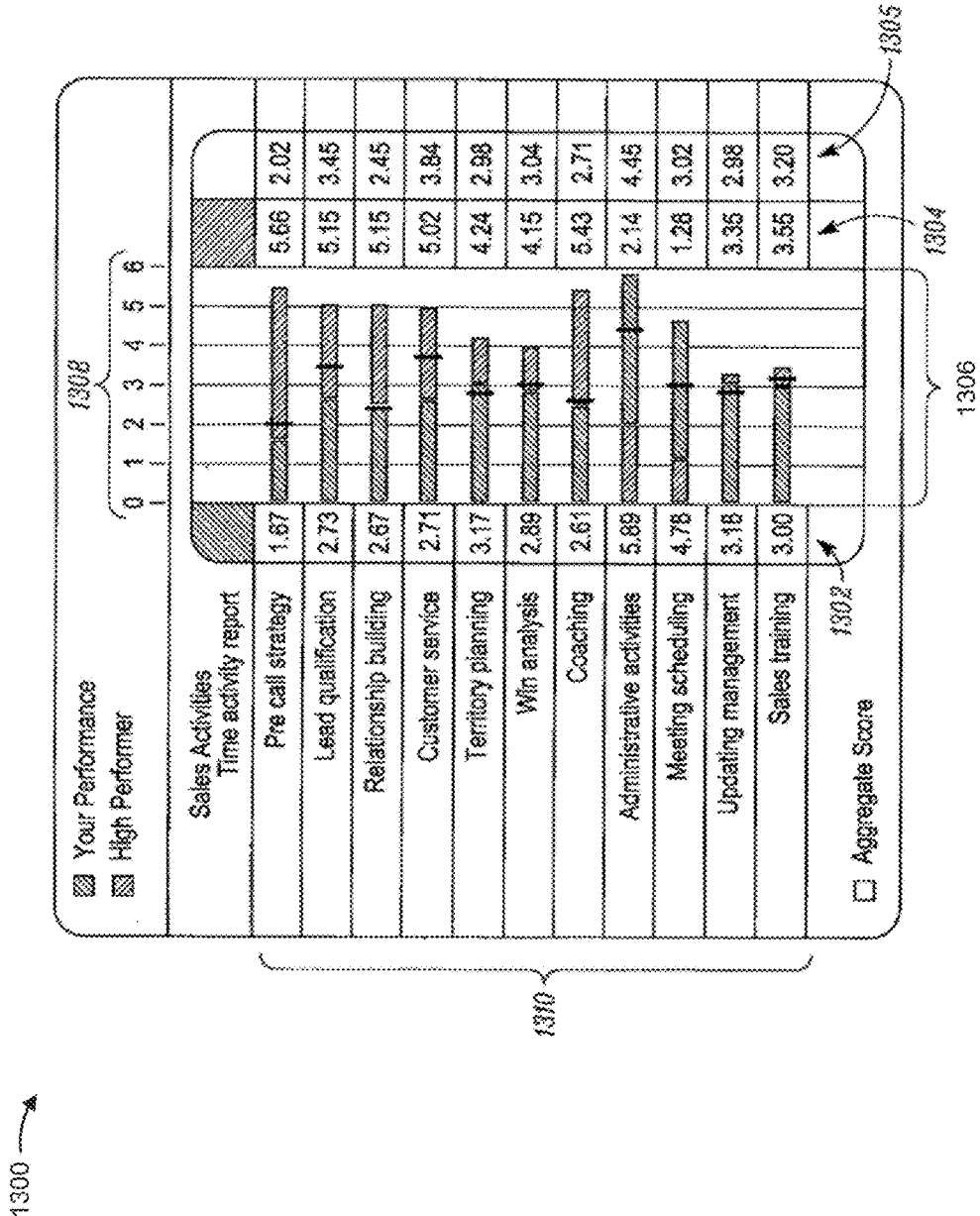

FIG. 13 illustrates an example of a user interface display 1300 for a report concerning an individual respondent's behavior attribute data 1302 (left-hand score column) as compared to selected respondent benchmark attribute data 1304 (inner right-hand score column). In this example, aggregated behavior assessment data 1305 (outer right-hand score column) is also provided. Note that an aggregate score could be determined across any desired group of individual respondents. As shown, bar charts 1306 illustrating the respective individual respondent and selected respondent scores (relative to an absolute scoring scale 1308) for each specific activity 1310 are also provided to visually illustrate the differences. Note the inclusion, in this example, of the heavy vertical lines displayed within the bar charts corresponding to the respective aggregated scores.

As indicated above, FIG. 13 is provided merely as an example. Other examples are possible, and may differ from what was described with regard to FIG. 13.

Figure 14:
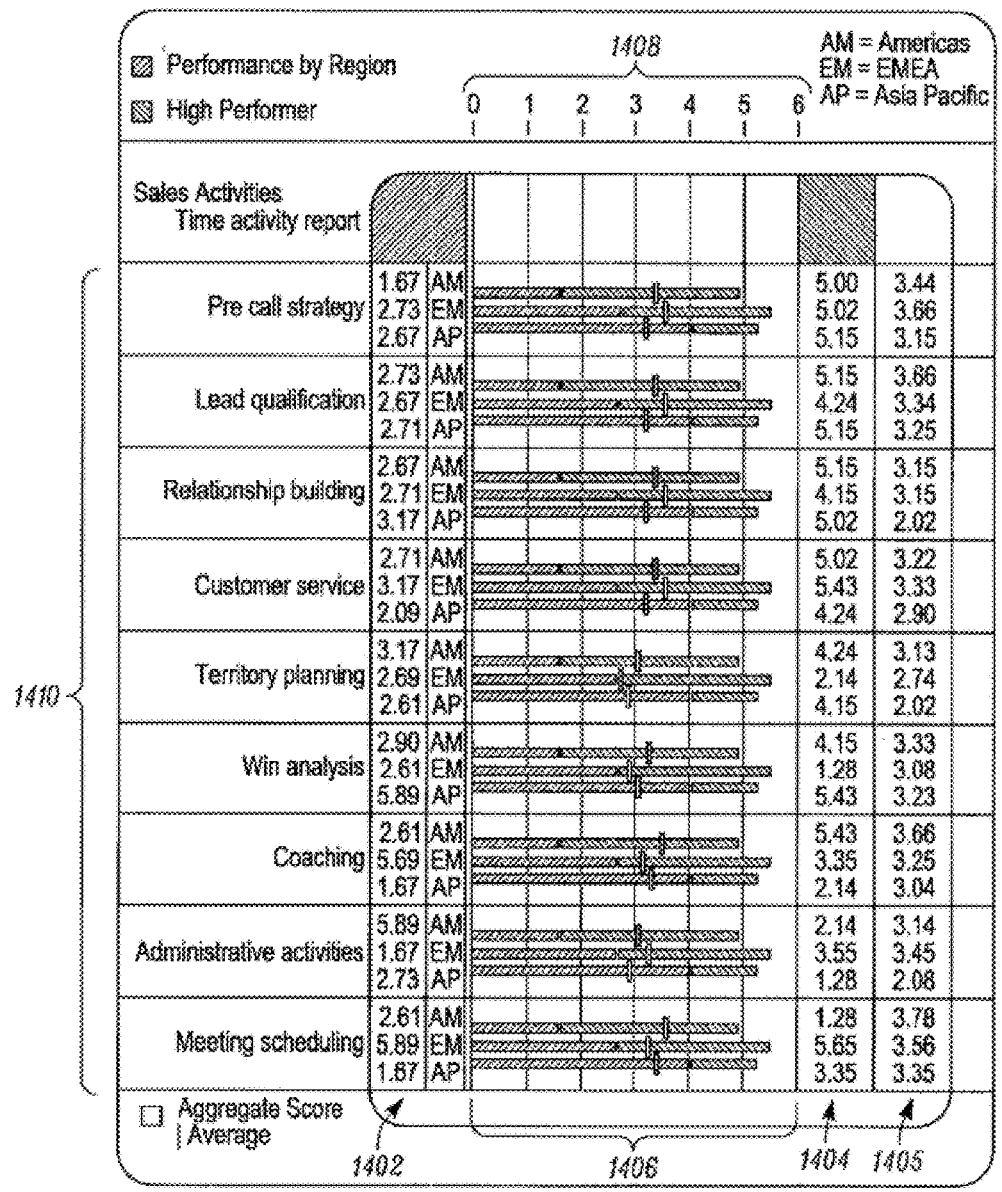

FIG. 14 is an example of a user interface display 1400 for a report concerning various behavior attribute data for a variety of aggregated groups, in this example, according to geographic region of respondents associated with the behavior attribute data. Each aggregated group's assessment data 1402 (left-hand column) is provided along with high sales performer benchmark data 1404 (inner right-hand score column). In this example, the average score for each aggregated group 1405 (outer right-hand score column) is also provided. As in FIG. 13, each aggregated group's scores are illustrated (relative to an absolute scoring scale 1408) in comparison with the selected respondent attribute data using bar charts 1406, with the aggregated group average score indicated by a heavy vertical line within each of the bar charts. Further still, an overall aggregated average for each activity across all groups is illustrated by the dotted vertical line crossing each group's bar chart.

As indicated above, FIG. 14 is provided merely as an example. Other examples are possible, and may differ from what was provided with regard to FIG. 14.

As can be seen from the examples illustrated in FIGS. 11-14, the reports illustrate an overall gap map that shows attributes for which both individual and overall (i.e., organization wide) improvement may be warranted. While FIGS. 11-14 illustrate specific instances of report formats, a variety of presentation formats may be employed to present such information, and that the instant disclosure is not limited in this regard.

In this way, processor resources are conserved that would otherwise be used to configure an approach for determining correlations between attributes and performance (e.g., based on a manually-generated user interface, based on manually specified rules, etc.). Moreover, implementations described herein use well-defined automatic processes to automate a task that was previously performed by a human based on subjective intuition of the human (e.g., identifying attributes of users, identifying correlations between attributes and performance, and selecting users for tasks based on the attributes). Furthermore, allocation or training of users may be improved based on the correlations, which saves organizational resources and improves performance of the users.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An analytics platform, comprising:
a memory; and
one or more processors to:
receive a plurality of testing parameters;
identify a task or a profession associated with a first respondent of a plurality of respondents,
identify a first subset of attributes, of a plurality of attributes, to be tested with regards to the first respondent based on the plurality of testing parameters and the task or the profession associated with the first respondent,
generate a first user interface, of a plurality of user interfaces, for the first respondent based on the first subset of attributes, and
generate a second user interface, of the plurality of user interfaces, for a second respondent, of the plurality of respondents, based on a second subset of attributes of the plurality of attributes,
the second user interface being different from the first user interface, and
the second subset of attributes being different from the first subset of attributes;

provide, for display by a plurality of user devices of the plurality of respondents, the plurality of user interfaces;
receive, from the plurality of user devices and based on interactions with the plurality of user interfaces, first test information,
the first test information identifying first values;
identify, based on the first test information, characteristic attributes;
train, based on values of the characteristic attributes and performance information, a predictive model,
the predictive model to receive, as input, second test information, and
the predictive model to output predicted performance information;
obtain the second test information;
determine the predicted performance information using the predictive model; and
perform an action based on the predicted performance information.

2. The analytics platform of claim 1,
where the second user interface includes information relevant to determining the values of the characteristic attributes.

3. The analytics platform of claim 1, where the one or more processors, when identifying the characteristic attributes, are to:
identify the characteristic attributes based on performing at least one of:
a discriminant analysis test,
a logarithmic regression analysis, or
a T test,
the characteristic attributes being identified based on respective values of the characteristic attributes.

4. The analytics platform of claim 1, where the one or more processors are further to:
receive observed performance information; and
update the predictive model based on a machine learning algorithm, the observed performance information, and the predicted performance information.

5. The analytics platform of claim 1, where the one or more processors are further to:
identify respective values of the characteristic attributes based on the second test information; and
where the one or more processors, when determining the predicted performance information, are to:
input the respective values to the predictive model,
the predictive model to output the predicted performance information based on the respective values.

6. The analytics platform of claim 5, where the respective values of the characteristic attributes are second values of the characteristic attributes; and
where the one or more processors, when performing the action, are to:
generate a report identifying differences between first values of the characteristic attributes and the second values of the characteristic attributes.

7. The analytics platform of claim 1, where the one or more processors, when determining the predicted performance information, are to:
determine information identifying a prediction of whether the second respondent will be categorized as a selected respondent or a non-selected respondent.

8. A method, comprising:
receiving, by a device, a plurality of testing parameters;
identifying, by the device, a task or a profession associated with a first respondent of a plurality of respondents,
identifying, by the device, a first subset of attributes, of a plurality of attributes, to be tested with regards to the first respondent based on the plurality of testing parameters and the task or the profession associated with the first respondent,
generating, by the device, a first user interface, of a plurality of user interfaces, for the first respondent based on the first subset of attributes, and
generating, by the device, a second user interface, of the plurality of user interfaces, for a second respondent, of the plurality of respondents, based on a second subset of attributes of the plurality of attributes,
the second user interface being different from the first user interface, and
the second subset of attributes being different from the first subset of attributes;
providing, by the device and for display by a plurality of user devices of the plurality of respondents, the plurality of user interfaces;
receiving, from the plurality of user devices and based on interactions with the plurality of user interfaces, first test information,
the first test information identifying first values;
identifying, by the device, based on the first test information, characteristic attributes;
training, based on values of the characteristic attributes and performance information, a predictive model,
the predictive model to receive, as input, second test information, and
the predictive model to output predicted performance information;
obtaining, by the device, the second test information;
determining, by the device, the predicted performance information using the predictive model; and
performing, by the device, an action based on the predicted performance information.

9. The method of claim 8, further comprising:
determining information identifying the first respondent and the second respondent based on the performance information,
the information identifying the first respondent and the second respondent being determined based on the performance information satisfying a threshold.

10. The method of claim 8, where training the predictive model comprises:
training the predictive model based on one or more of:
a machine learning algorithm, or
a neural network.

11. The method of claim 8, further comprising:
determining, based on the first test information, first values of the characteristic attributes;
determining, based on the second test information, second values of the characteristic attributes; and
where performing the action based on the predicted performance information comprises:
providing information identifying a difference between the first values and the second values.

12. The method of claim 11, further comprising:
providing information identifying a recommendation for training to improve the second values.

13. The method of claim 11, where determining the first values comprises:
determining the first values based on natural language processing; and where determining the second values comprises:
   determining the second values based on natural language processing.

14. The method of claim 8, where the characteristic attributes relate to one or more of:
   personality attributes of the first respondent or the second respondent,
   behavior attributes of the first respondent or the second respondent, or
   competency attributes of the first respondent or the second respondent.

15. A non-transitory computer-readable medium storing instructions, the instructions comprising:
   one or more instructions that, when executed by one or more processors, cause the one or more processors to:
      receive a plurality of testing parameters;
      generate a plurality of user interfaces, for a plurality of respondents, based on the plurality of testing parameters,
         where the one or more instructions, that cause the one or more processors to generate the plurality of user interfaces, cause the one or more processors to:
            identify a task or a profession associated with a first respondent of the plurality of respondents,
            identify a first subset of attributes, of a plurality of attributes, to be tested with regards to the first respondent based on the testing parameters and the task or the profession associated with the first respondent;
            generate a first user interface, of the plurality of user interfaces, for the first respondent based on the first subset of attributes; and
            generate a second user interface, of the plurality of user interfaces, for a second respondent, of the plurality of respondents, based on a second subset of attributes of the plurality of attributes, the second user interface being different from the first user interface, and
               the second subset of attributes being different from the first subset of attributes;
      provide, for display by a plurality of user devices of the plurality of respondents, the plurality of user interfaces;
      receive, from the plurality of user devices and based on interactions with the plurality of user interfaces, first test information,
         the first test information identifying first values;
      identify, based on the first test information, characteristic attributes,
      train, based on values of the characteristic attributes and performance information, a predictive model,
         the predictive model to receive, as input, second test information, and
         the predictive model to output predicted performance information;
      obtain the second test information;
      determine the predicted performance information using the predictive model; and
      perform an action based on the predicted performance information.

16. The non-transitory computer-readable medium of claim 15, where the one or more instructions, when executed by the one or more processors, further cause the one or more processors to:
   receive observed performance information associated with the second respondent; and
   update the predictive model based on the observed performance information and the predicted performance information,
      the predictive model being updated based on one or more of:
         a machine learning algorithm, or
         a neural network process.

17. The non-transitory computer-readable medium of claim 15, where the one or more instructions, that cause the one or more processors to perform the action, further cause the one or more processors to:
   generate a report based on second values of the characteristic attributes associated with the second respondent,
      the report to compare the second values and first values of the characteristic attributes associated with the first respondent.

18. The non-transitory computer-readable medium of claim 15, where the testing parameters identify questions to be provided to the plurality of respondents; and
   where the one or more instructions, that cause the one or more processors to generate the plurality of user interfaces, cause the one or more processors to:
      generate a questionnaire, including the questions, to be provided to the plurality of respondents.

19. The non-transitory computer-readable medium of claim 15,
   where:
      the second user interface is to receive responses to questions regarding the characteristic attributes, and
      respective values of the characteristic attributes associated with the second respondent is determined based on the responses.

20. The non-transitory computer-readable medium of claim 15, where the one or more instructions, that cause the one or more processors to obtain the second test information, cause the one or more processors to:
   obtain test information associated with the second respondent,
      the test information being provided by an entity associated with the second respondent; and
   where the one or more instructions, when executed by the one or more processors, cause the one or more processors to:
      assign a weight to the test information based on information identifying a relationship between the second respondent and the entity associated with the second respondent,
         the predicted performance information being determined based on the weight and the test information.

* * * * *